(12) United States Patent
Oh

(10) Patent No.: US 11,431,082 B2
(45) Date of Patent: Aug. 30, 2022

(54) ELECTRONIC DEVICE HAVING A PLURALITY OF COIL ANTENNAS

(71) Applicant: Samsung Electronics Co., Ltd., Suwon-si (KR)

(72) Inventor: Chanhee Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 302 days.

(21) Appl. No.: 16/795,945

(22) Filed: Feb. 20, 2020

(65) Prior Publication Data
US 2020/0411953 A1    Dec. 31, 2020

(30) Foreign Application Priority Data

Jun. 26, 2019    (KR) .................. 10-2019-0076523

(51) Int. Cl.
| | |
|---|---|
| H01Q 1/24 | (2006.01) |
| H01F 27/28 | (2006.01) |
| H01Q 1/22 | (2006.01) |
| H04B 5/00 | (2006.01) |
| H01F 5/00 | (2006.01) |

(52) U.S. Cl.
CPC .............. *H01Q 1/243* (2013.01); *H01F 5/003* (2013.01); *H01F 27/2804* (2013.01); *H01Q 1/2216* (2013.01); *H04B 5/0087* (2013.01)

(58) Field of Classification Search
CPC ...... H01F 27/2804; H01F 38/14; H01F 5/003; H01Q 1/2216; H01Q 1/243; H02J 50/005; H04B 5/0087
See application file for complete search history.

(56) References Cited

U.S. PATENT DOCUMENTS

| | | | |
|---|---|---|---|
| 10,224,984 B1* | 3/2019 | Li | ................... H02J 50/005 |
| 2017/0237149 A1* | 8/2017 | Lee | ................ G06Q 20/3278 |
| | | | 361/679.21 |

(Continued)

FOREIGN PATENT DOCUMENTS

KR    10-1963288 B1    3/2019

OTHER PUBLICATIONS

Samsung Electronics, "Samsung Electronics Releases the Galaxy Fold, a Foldable Smartphone" retrieved from https://news.samsung.com/kr/%ec%82%bc%ec%84%b1%ec%a0%84%ec%9e%90-%ed%8f%b4%eb%8d%94%eb%b8%94-%ec%8a%a4%eb%a7%88%ed%8a%b8%ed%8f%b0-%ea%b0%a4%eb%9f%ad%ec%8b%9c-%ed%8f%b4%eb%93%9c-%ec%a0%84%ea%b2%a9-%ea%b3%b5, Feb. 21, 2019.

(Continued)

*Primary Examiner* — Thien M Le
(74) *Attorney, Agent, or Firm* — Jefferson IP Law, LLP

(57) ABSTRACT

An electronic device is provided. The electronic device includes a housing structure including a first surface facing in a first direction and a second surface facing in a second direction opposite to the first direction, a display unit disposed at the first surface, a printed circuit board disposed inside the housing structure, a first coil disposed between the printed circuit board and the second surface and electrically connected to the printed circuit board and including a first pattern wound one or more times about a first axis parallel to the second direction, and a second coil disposed between the printed circuit board and the second surface and electrically connected to the printed circuit board and including a second pattern wound one or more times about a second axis parallel to the second direction.

18 Claims, 16 Drawing Sheets

(56) References Cited

U.S. PATENT DOCUMENTS

| | | | |
|---|---|---|---|
| 2017/0288298 A1 | 10/2017 | Kim | |
| 2018/0040950 A1* | 2/2018 | Lee et al. | |
| 2018/0069294 A1* | 3/2018 | Kang | H01Q 1/38 |
| 2018/0198209 A1* | 7/2018 | Kang | H01Q 1/38 |
| 2018/0241438 A1 | 8/2018 | Ahn et al. | |
| 2018/0248416 A1* | 8/2018 | Yoshizawa | H02J 50/12 |
| 2018/0269720 A1* | 9/2018 | Yoshizawa | H02J 50/12 |
| 2018/0275725 A1 | 9/2018 | Lin et al. | |
| 2018/0287258 A1 | 10/2018 | Kim et al. | |
| 2018/0301790 A1 | 10/2018 | Kim et al. | |
| 2020/0267834 A1* | 8/2020 | Lee | H04B 5/0031 |
| 2021/0099570 A1* | 4/2021 | Schenone | H04M 1/72454 |
| 2021/0135508 A1* | 5/2021 | Sieklik | H02J 50/90 |

OTHER PUBLICATIONS

International Search Report dated May 29, 2020; International Appln. No. PCT/KR2020/002495.

\* cited by examiner

ELECTRONIC DEVICE HAVING A PLURALITY OF COIL ANTENNAS

CROSS-REFERENCE TO RELATED APPLICATION(S)

This application is based on and claims priority under 35 U.S.C. § 119(a) of a Korean patent application number 10-2019-0076523, filed on Jun. 26, 2019, in the Korean Intellectual Property Office, the disclosure of which is incorporated by reference herein in its entirety.

BACKGROUND

1. Field

The disclosure relates to a plurality of coils used as antennas in an electronic device.

An electronic device (e.g., smart phone) may include a plurality of coils. For example, the electronic device may include a first coil for supporting near field communication (NFC) and a second coil for supporting wireless charging (e.g., wireless power consortium (WPC)).

2. Description of Related Art

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device having a structure in which patterns are disposed therein so as to secure a desired radiation performance even when the patterns are overlapped.

The electronic device includes a first coil having a first surface facing in a first direction and in which a display unit is disposed, a second surface facing in a second direction opposite to the first direction, and a first pattern wound one or more about a first axis parallel to the second direction and a second coil having a second pattern wound one or more about a second axis parallel to the second direction. The first pattern and the second pattern may be disposed inside the electronic device so as not to overlap each other when facing the second surface.

When the patterns are overlapped, parasitic resonance occurs in the coil (e.g., the first coil), thus, a radiation performance of the coil may be degraded. However, a narrow width of the second surface makes it difficult to dispose the patterns inside the electronic device without overlapping.

Additional aspects will be set forth in part in the description which follows and, in part, will be apparent from the description, or may be learned by practice of the presented embodiments.

In accordance with an aspect of the disclosure, an electronic device is provided. The electronic device includes a housing structure including a first surface facing in a first direction and a second surface facing in a second direction opposite to the first direction, a display unit disposed at the first surface, a printed circuit board disposed inside the housing structure, a first coil disposed between the printed circuit board and the second surface and electrically connected to the printed circuit board and including a first pattern wound one or more times about a first axis parallel to the second direction, and a second coil disposed between the printed circuit board and the second surface and electrically connected to the printed circuit board and including a second pattern wound one or more times about a second axis parallel to the second direction. When facing the second surface, a portion of the first pattern may be extended from a periphery of the second pattern to the other periphery of the second pattern across a space formed inside the second pattern.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
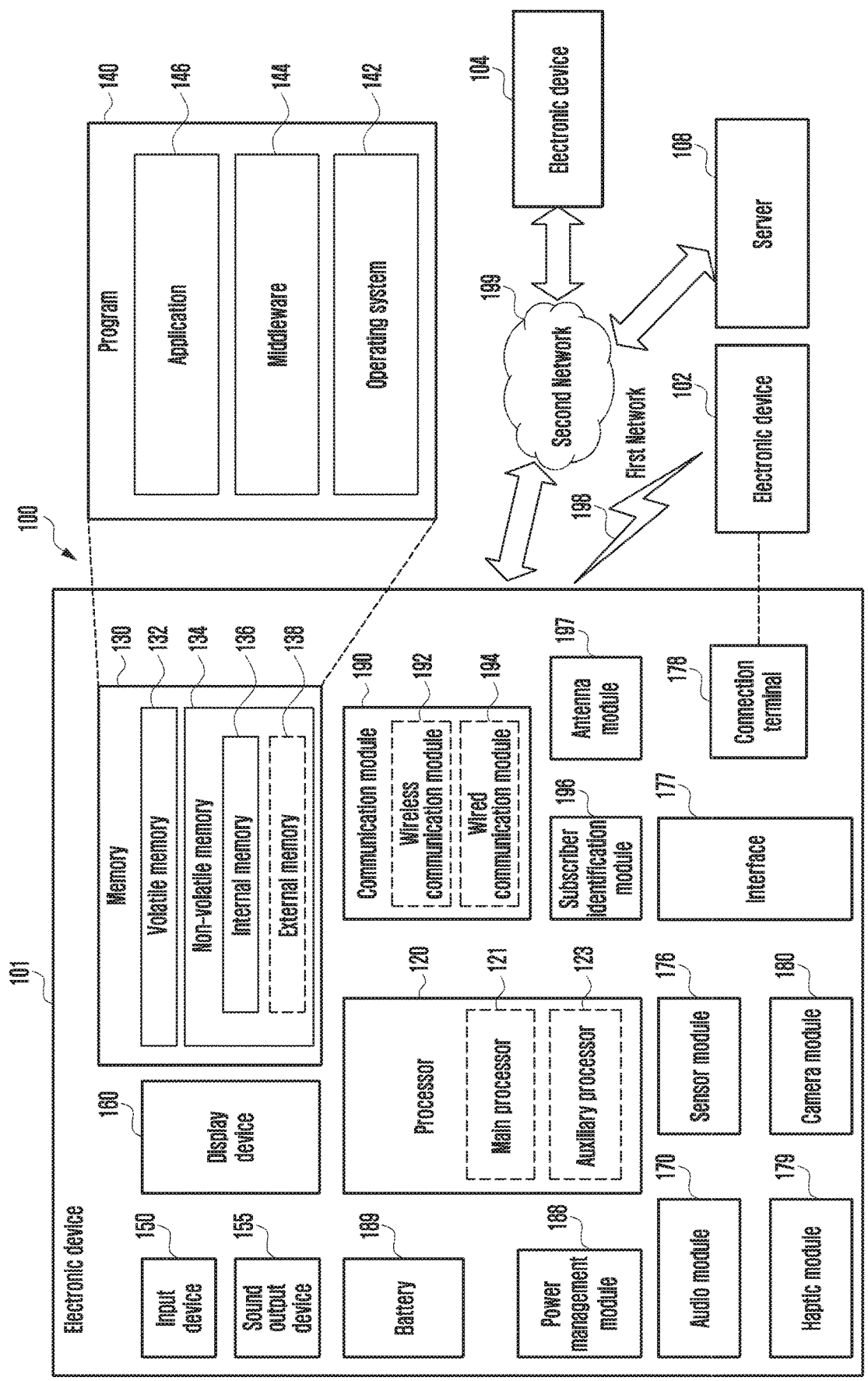
FIG. 1 is a block diagram illustrating a configuration of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
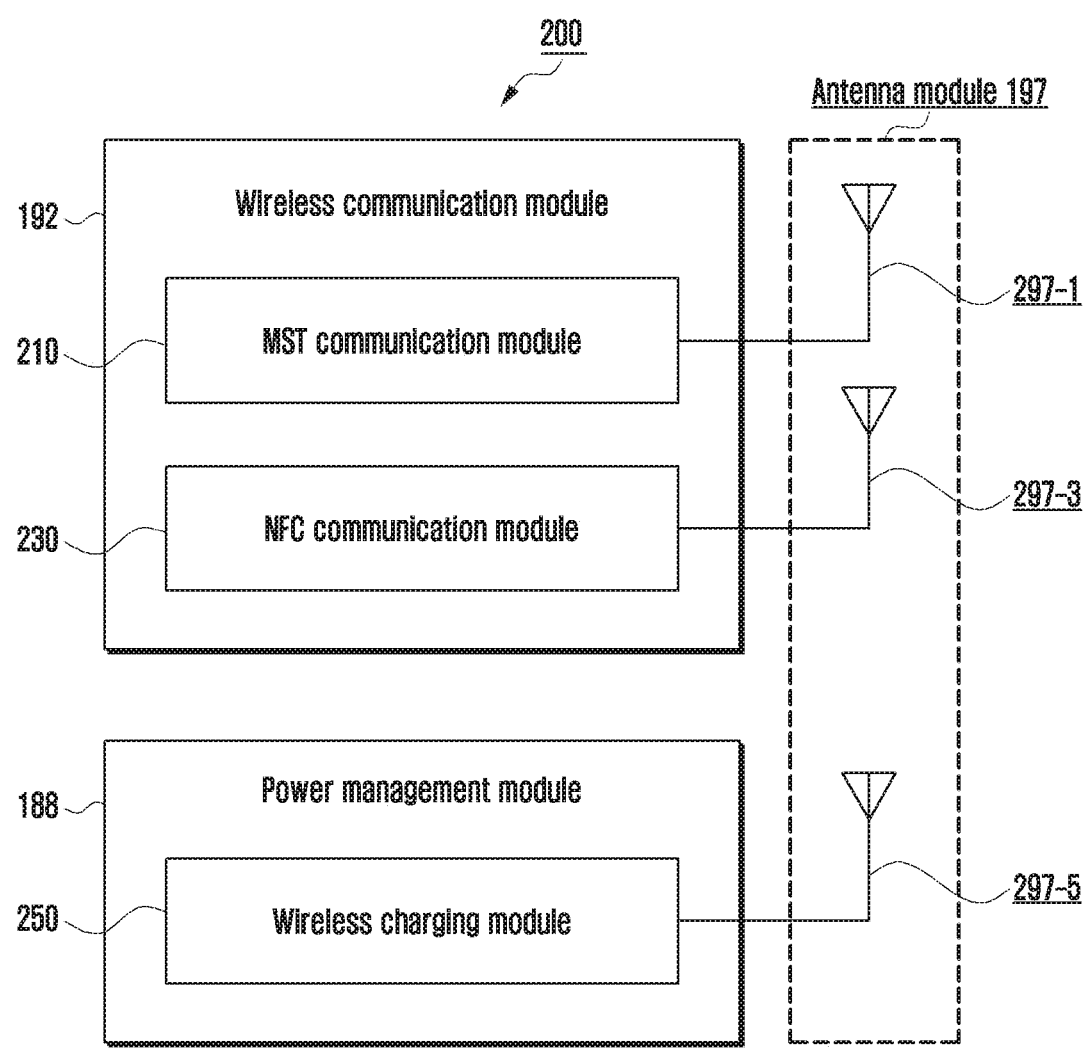
FIG. 2 is a block diagram illustrating a wireless communication module, a power management module, and an antenna module of an electronic device according to an embodiment of the disclosure.

FIG. 2 is a block diagram 200 illustrating the wireless communication module 192, the power management module 188, and the antenna module 197 of the electronic device 101 according to an embodiment of the disclosure.

Referring to FIG. 2, the wireless communication module 192 may include a magnetic secure transmission (MST) communication module 210 or a near-field communication (NFC) module 230, and the power management module 188 may include a wireless charging module 250. In such a case, the antenna module 197 may include a plurality of antennas that include a MST antenna 297-1 connected with the MST communication module 210, a NFC antenna 297-3 connected with the NFC communication module 230, and a wireless charging antenna 297-5 connected with the wireless charging module 250. For ease of description, the same components as those described in regard to FIG. 1 are briefly described or omitted from the description.

The MST communication module 210 may receive a signal containing control information or payment information such as card information from the processor 120, generate a magnetic signal corresponding to the received signal, and then transfer the generated magnetic signal to the external electronic device 102 (e.g., a point-of-sale (POS) device) via the MST antenna 297-1. To generate the magnetic signal, according to an embodiment, the MST communication module 210 may include a switching module (not shown) that includes one or more switches connected with the MST antenna 297-1, and control the switching module to change the direction of voltage or current supplied to the MST antenna 297-1 according to the received signal. The change of the direction of the voltage or current allows the direction of the magnetic signal (e.g., a magnetic field) emitted from the MST antenna 297-1 to change accordingly. If detected at the external electronic device 102, the magnetic signal with its direction changing may cause an effect (e.g., a waveform) similar to that of a magnetic field that is generated when a magnetic card corresponding to the card information associated with the received signal is swiped through a card reader of the electronic device 102. According to an embodiment, for example, payment-related information and a control signal that are received by the electronic device 102 in the form of the magnetic signal may be further transmitted to an external server 108 (e.g., a payment server) via the network 199.

The NFC communication module 230 may obtain a signal containing control information or payment information such as card information from the processor 120 and transmit the obtained signal to the external electronic device 102 via the NFC antenna 297-3. According to an embodiment, the NFC communication module 230 may receive such a signal transmitted from the external electronic device 102 via the NFC antenna 297-3.

The wireless charging module 250 may wirelessly transmit power to the external electronic device 102 (e.g., a cellular phone or wearable device) via the wireless charging antenna 297-5, or wirelessly receive power from the external electronic device 102 (e.g., a wireless charging device). The wireless charging module 250 may support one or more of various wireless charging schemes including, for example, a magnetic resonance scheme or a magnetic induction scheme.

According to an embodiment, some of the MST antenna 297-1, the NFC antenna 297-3, or the wireless charging antenna 297-5 may share at least part of their radiators. For example, the radiator of the MST antenna 297-1 may be used as the radiator of the NFC antenna 297-3 or the wireless charging antenna 297-5, or vice versa. In such a case, the antenna module 197 may include a switching circuit (not shown) adapted to selectively connect (e.g., close) or disconnect (e.g. open) at least part of the antennas 297-1, 297-3, or 297-5, for example, under the control of the wireless communication module 192 (e.g., the MST communication module 210 or the NFC communication module 230) or the power management module (e.g., the wireless charging module 250). For example, when the electronic device 101 uses a wireless charging function, the NFC communication module 230 or the wireless charging module 250 may control the switching circuit to temporarily disconnect at least one portion of the radiators shared by the NFC antenna 297-3 and the wireless charging antenna 297-5 from the NFC antenna 297-3 and to connect the at least one portion of the radiators with the wireless charging antenna 297-5.

According to an embodiment, at least one function of the MST communication module 210, the NFC communication module 230, or the wireless charging module 250 may be controlled by an external processor (e.g., the processor 120). According to an embodiment, at least one specified function (e.g., a payment function) of the MST communication module 210 or the NFC communication module 230 may be performed in a trusted execution environment (TEE). According to an embodiment, the TEE may form an execution environment in which, for example, at least some designated area of the memory 130 is allocated to be used for performing a function (e.g., a financial transaction or personal information-related function) that requires a relatively high level of security. In such a case, access to the at least some designated area of the memory 130 may be restrictively permitted, for example, according to an entity accessing thereto or an application being executed in the TEE.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3A:
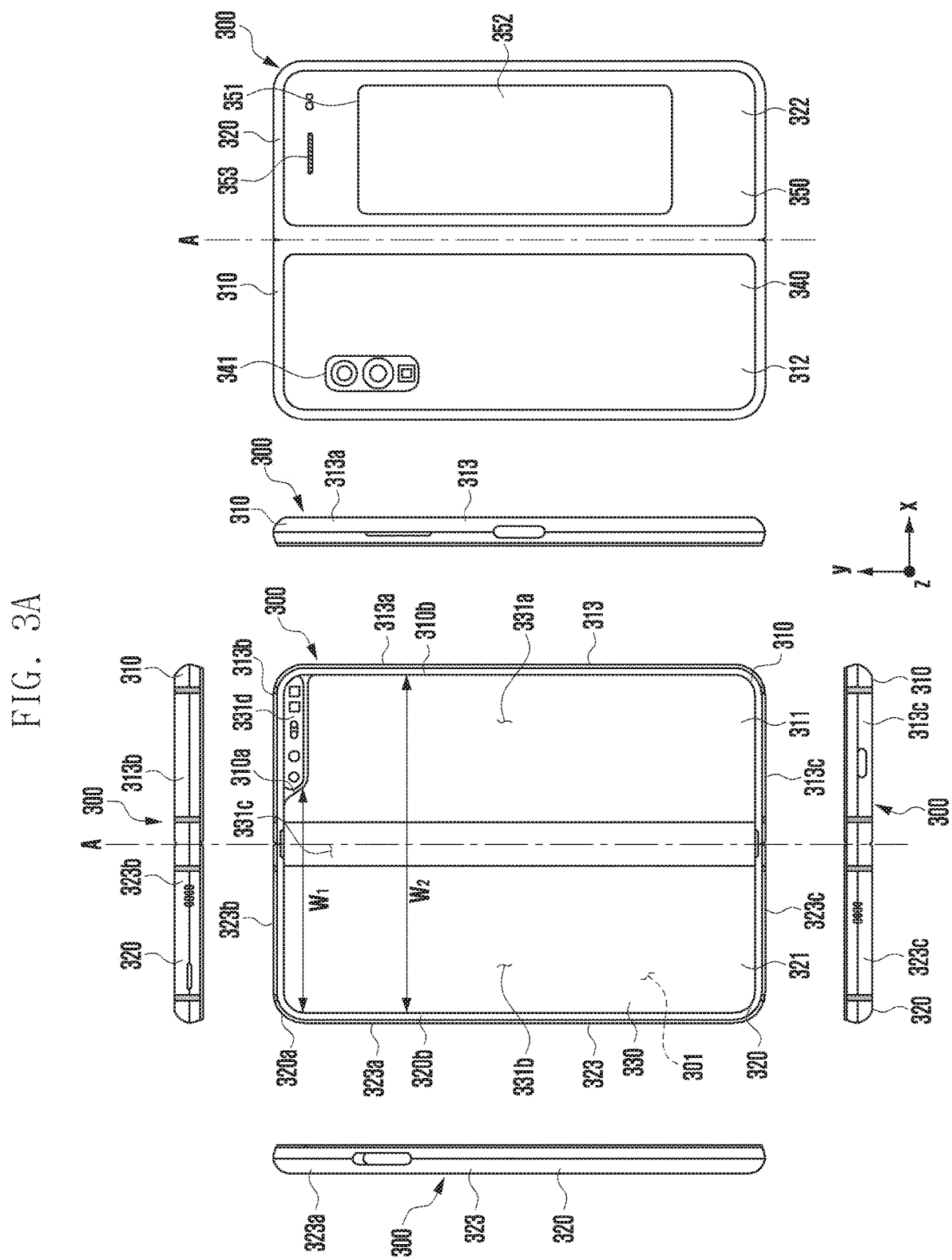
FIG. 3A is a diagram illustrating a flat state of an electronic device according to an embodiment of the disclosure.

FIG. 3A is a diagram illustrating a flat state of an electronic device according to an embodiment of the disclosure.

Figure 3B:
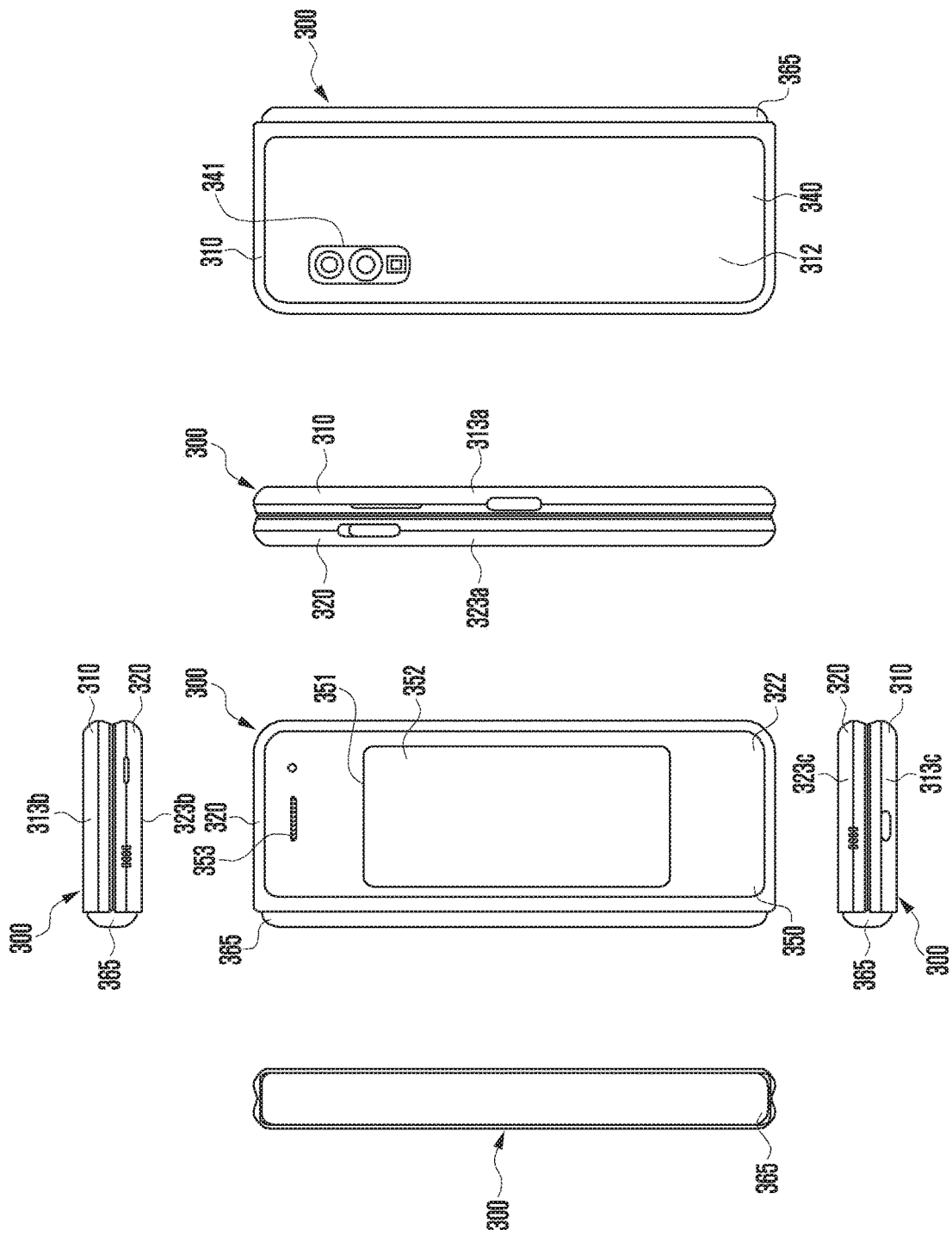
FIG. 3B is a diagram illustrating a folded state of an electronic device according to an embodiment of the disclosure.

FIG. 3B is a diagram illustrating a folded state of an electronic device according to an embodiment of the disclosure.

Figure 3C:
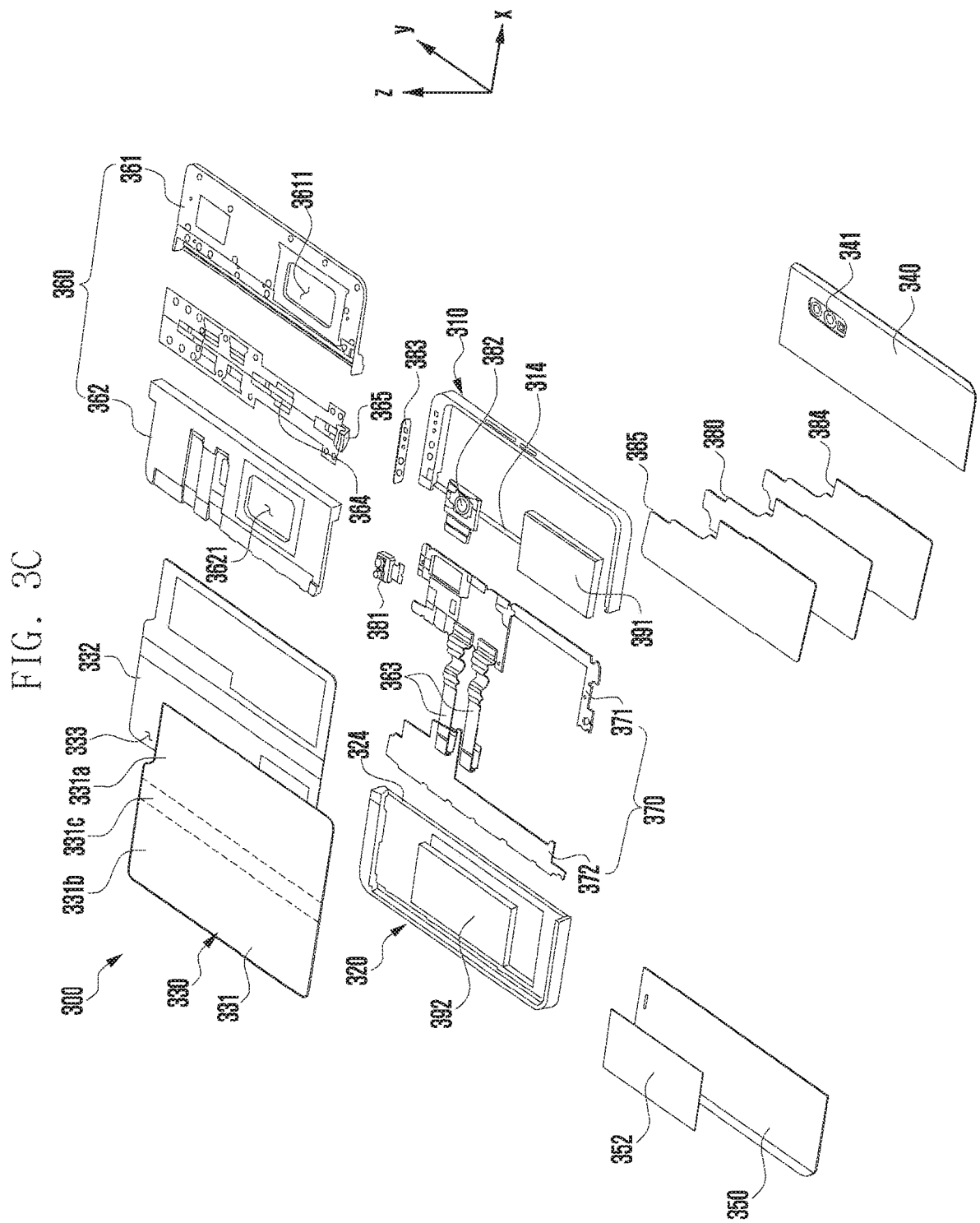
FIG. 3C is an exploded perspective view illustrating an electronic device according to an embodiment of the disclosure.

FIG. 3C is an exploded perspective view illustrating an electronic device according to an embodiment of the disclosure.

Referring to FIG. 3A, an electronic device 300 (e.g., the electronic device 101 of FIG. 1) may include a pair of housing structures 310 and 320 (e.g., foldable housing structure) rotatably coupled through a hinge structure (e.g., a hinge structure 364 of FIG. 3C) to be folded to each other, a hinge cover (e.g., a hinge cover 365 of FIG. 3B) for covering a foldable portion of the pair of housing structures 310 and 320, and a display unit 330 (e.g., flexible display, foldable display, or first display) disposed in a space formed by the pair of housing structures 310 and 320. In this document, a surface in which the display unit 330 is disposed may be defined as a front surface of the electronic device 300, and an opposite surface of the front surface may be defined as a rear surface of the electronic device 300. Further, a surface enclosing a space between the front surface and the rear surface may be defined as a side surface of the electronic device 300.

In one embodiment, the pair of housing structures 310 and 320 may include a first housing structure 310, a second housing structure 320, a first rear cover 340, and a second rear cover 350 including a sensor area 331d. The pair of housing structures 310 and 320 of the electronic device 300 are not limited to shapes and combinations illustrated in FIGS. 3A and 3B, but may be implemented by a combination and/or coupling of other shapes or components. For example, in another embodiment, the first housing structure 310 and the first rear cover 340 may be integrally formed, and the second housing structure 320 and the second rear cover 350 may be integrally formed.

According to one embodiment, the first housing structure 310 and the second housing structure 320 may be disposed at both sides about a folding axis (axis A) and have a shape generally symmetrical with respect to the folding axis (axis A). According to an embodiment, an angle or a distance between the first housing structure 310 and the second housing structure 320 may vary according to whether a state of the electronic device 300 is a flat state or an unfolded state, a folded state, or an intermediate state. According to one embodiment, unlike the second housing structure 320, the first housing structure 310 further includes a sensor area 331d in which various sensors are disposed, but may have a symmetrical shape in other areas. In another embodiment, the sensor area 331d may be further disposed or replaced in at least a partial area of the second housing structure 320.

In one embodiment, the first housing structure 310 may include a first surface 311 connected to a hinge structure (e.g., the hinge structure 364 of FIG. 3C) in a flat state of the electronic device 300 and facing in the first direction, a second surface 312 facing in a second direction opposite to the first direction, and a first side member 313 enclosing at least a portion of a space between the first surface 311 and the second surface 312. In one embodiment, the first side member 313 may include a first side surface 313a disposed in parallel to a folding axis (axis A), a second side surface 313b extended in a direction perpendicular to the folding axis from one end of the first side surface 313*a*, and a third side surface 313*c* extended in a direction perpendicular to the folding axis (axis A) from the other end of the first side surface 313*a*.

In an embodiment, the second housing structure 320 may include a third surface 321 connected to a hinge structure (e.g., the hinge structure 364 of FIG. 3C) in a flat state of the electronic device 300 and facing in a third direction, a fourth surface 322 facing in a fourth direction opposite to the third direction, and a second surface member 323 enclosing at least a portion of a space between the third surface 321 and the fourth surface 322. When the housing structures 310 and 320 are folded, the first surface 311 may face the third face 321, and when the housing structures 310 and 320 are flat, the third direction may be the same as the first direction. In one embodiment, the second surface member 323 may include a fourth side surface 323*a* disposed parallel to the folding axis (axis A), a fifth side surface 323*b* extended in a direction perpendicular to the folding axis (axis A) from one end of the fourth side surface 323*a*, and a sixth side surface 323*c* extended in a direction perpendicular to the folding axis (axis A) from the other end of the fourth side surface 323*a*. In one embodiment, the third surface 321 may be disposed to face the first surface 311 in a folded state.

In one embodiment, the electronic device 300 may include a recess 301 formed to receive the display unit 330 through a structural shape combination of the first housing structure 310 and the second housing structure 320. The recess 301 may have substantially the same size as that of the display unit 330. In one embodiment, because of the sensor area 331*d*, the recess 301 may have two or more different widths in a direction perpendicular to the folding axis (axis A). For example, the recess 301 may have a first width W1 between a first portion 320*a* parallel to the folding axis (axis A) of the second housing structure 320 and a first portion 310*a* formed at a periphery of the sensor area 331*d* of the first housing structure 310 and the second width W2 formed by a second portion 320*b* of the second housing structure 310 and a second portion 310*b* parallel to the folding axis (axis A) while not corresponding to the sensor area 331*d* of the first housing structure 310. In this case, a second width W2 may be formed longer than a first width W1. For example, the recess 301 may be formed to have the first width W1 formed from the first portion 310*a* of the first housing structure 310 to the first portion 320*a* of the second housing structure 320 having a mutually asymmetric shape and the second width W2 formed from the second portion 310*b* of the first housing structure 310 to the second portion 320*b* of the second housing structure 320 having a mutually symmetrical shape. In one embodiment, the first portion 310*a* and the second portion 310*b* of the first housing structure 310 may be formed to have different distances from the folding axis (axis A). A width of the recess 301 is not limited to an illustrated example. In various embodiments, the recess 301 may have two or more different widths by a shape of the sensor area 331*d* or by a portion having asymmetrical shapes of the first housing structure 310 and the second housing structure 320.

In one embodiment, at least a portion of the first housing structure 310 and the second housing structure 320 may be made of a metallic material or a non-metallic material having rigidity of a selected magnitude that is sufficient to support the display unit 330.

In an embodiment, the sensor area 331*d* may be formed to have a predetermined area adjacent to one corner of the first housing structure 310. However, a position, shape, or size of the sensor area 331*d* is not limited to the illustrated example. For example, in other embodiments, the sensor area 331*d* may be provided in any area between an upper end corner and a lower end corner or in another corner of the first housing structure 310. In another embodiment, the sensor area 331*d* may be disposed in at least a partial area of the second housing structure 320. In another embodiment, the sensor area 331*d* may be disposed to extend to the first housing structure 310 and the second housing structure 320. In an embodiment, the electronic device 300 may include components for performing various functions that are exposed to a front surface of the electronic device 300 through the sensor area 331*d* or through one or more openings provided in the sensor area 331*d*. In various embodiments, the components may include, for example, at least one of a front camera device, a receiver, a proximity sensor, an illuminance sensor, an iris recognition sensor, an ultrasonic sensor, or an indicator.

In one embodiment, the first rear cover 340 may be disposed at the second surface 312 of the first housing structure 310 and have a substantially rectangular periphery. In one embodiment, at least a portion of the periphery may be enclosed by the first housing structure 310. Similarly, the second rear cover 350 may be disposed at the fourth surface 322 of the second housing structure 320, and at least a portion of a periphery thereof may be enclosed by the second housing structure 320.

In the illustrated embodiment, the first rear cover 340 and the second rear cover 350 may have a substantially symmetrical shape based on a folding axis (axis A). In another embodiment, the first rear cover 340 and the second rear cover 350 may include various different shapes. In another embodiment, the first rear cover 340 may be integrally formed with the first housing structure 310, and the second rear cover 350 may be integrally formed with the second housing structure 320.

In an embodiment, the first rear cover 340, the second rear cover 350, the first housing structure 310, and the second housing structure 320 may provide a space in which various components (e.g., printed circuit board, antenna module (e.g., the antenna module 197 of FIG. 1), a sensor module (e.g., the sensor module 176 of FIG. 1), or a battery (e.g., the battery 189 of FIG. 1) of the electronic device 300 may be disposed through a structure coupled to each other. In an embodiment, at the rear surface of the electronic device 300, one or more components may be disposed or visually exposed. For example, one or more components or sensors may be visually exposed through a first rear area 341 of the front rear cover 340. In various embodiments, the sensors may include a proximity sensor, a rear camera device, and/or a flash. In another embodiment, at least a portion of a sub display 352 (e.g., second display) may be visually exposed through a second rear area 351 of the second rear cover 350. In another embodiment, the electronic device 300 may include a speaker module 353 disposed through at least a partial area of the second rear cover 350.

The display unit 330 may be disposed above a space formed by the pair of housing structures 310 and 320. For example, the display unit 330 may be seated in the recess 301 formed by the pair of housing structures 310 and 320 and be disposed to occupy substantially most of the front surface of the electronic device 300. Accordingly, the front surface of the electronic device 300 may include a display unit 330, a partial area (e.g., periphery area) of the first housing structure 310 adjacent to the display unit 330, and a partial area (e.g., periphery area) of the second housing structure 320. In an embodiment, the rear surface of the electronic device 300 may include a first rear cover 340, a partial area (e.g., periphery area) of the first housing structure 310 adjacent to the first rear cover 340, a second rear cover 350, and a partial area (e.g., periphery area) of the second housing structure 320 adjacent to the second rear cover 350.

In one embodiment, the display unit 330 may have at least a partial area that may be transformed into a flat surface or a curved surface. In one embodiment, the display unit 330 may include a folding area 331c, a first area 331a disposed at one side (e.g., a right area of the folding area 331c) based on the folding area 331c, and a second area 331b disposed at the other side (e.g., a left area of the folding area 331c). For example, the first area 331a may be disposed at the first surface 311 of the first housing structure 310, and the second area 331b may be disposed at the third surface 321 of the second housing structure 320. In an embodiment, the division of the display unit 330 into three different areas is an example, and the display unit 330 may be divided into a plurality of areas (e.g., four or more or two) according to a structure or a function. For example, in the embodiment illustrated in FIG. 3A, an area of the display unit 330 may be divided by the folding axis (axis A) or the folding area 331c extended in parallel to the Y-axis, but in another embodiment, an area of the display unit 330 may be divided based on another folding area (e.g., a folding area parallel to the X-axis) or another folding axis (e.g., a folding axis parallel to the X-axis). The aforementioned area division of the display unit 330 is merely a physical division by the pair of housing structures 310 and 320 and a hinge structure (e.g., the hinge structure 364 of FIG. 3C), and through substantially the pair of housing structures 310 and 320 and the hinge structure (e.g., the hinge structure 364 of FIG. 3C), the display unit 330 may display one contiguous full screen. In an embodiment, the first area 331a and the second area 331b may have an entirely symmetrical shape about the folding area 331c. However, unlike the second area 331b, the first area 331a may include a notch area (e.g., the notch area 333 of FIG. 3C) that is shaped based on the presence of the sensor area 331d, but may have a symmetrical shape with the second area 331b in other areas. For example, the first area 331a and the second area 331b may include portions having symmetrical shapes and portions having asymmetrical shapes.

Referring to FIG. 3B, a hinge cover 365 may be disposed between the first housing structure 310 and the second housing structure 320 to be configured to cover internal components (e.g., the hinge structure 364 of FIG. 3C). In an embodiment, the hinge cover 365 may be covered or exposed to the outside by a portion of the first housing structure 310 and the second housing structure 320 according to an operating state (e.g., flat state or folded state) of the electronic device 300.

For example, as illustrated in FIG. 3A, when the electronic device 300 is in a flat state, the hinge cover 365 may be covered and not exposed by the first housing structure 310 and the second housing structure 320. For example, as illustrated in FIG. 3B, when the electronic device 300 is in a folded state (e.g., completely folded state), the hinge cover 365 may be exposed to the outside between the first housing structure 310 and the second housing structures 320. For example, when the first housing structure 310 and the second housing structure 320 are in an intermediate state folded with a certain angle, the hinge cover 365 may be at least partially exposed to the outside of the electronic device 300 between the first housing structure 310 and the second housing structure 320. In this case, the exposed area may be smaller than a fully folded state. In one embodiment, the hinge cover 365 may include a curved surface.

Hereinafter, an operation of the first housing structure 310 and the second housing structure 320 according to an operating state (e.g., flat state and folded state) of the electronic device 300 and each area of the display unit 330 are described.

In one embodiment, when the electronic device 300 is in a flat state (e.g., the state of FIG. 3A), the first housing structure 310 and the second housing structure 320 may have an angle of 180°, and the first area 331a and the second area 331b of the display unit 330 may be disposed to face the same direction. Further, the folding area 331c may form the same plane as that of the first area 331a and the second area 331b. In another embodiment, when the electronic device 300 is in a flat state, the first housing structure 310 and the second housing structure 320 may be folded opposite so that the second surface 312 and the fourth surface 322 face each other. That is, the first area 331a and the second area 331b of the display unit 330 may be disposed to face in opposite directions with respect to each other.

In an embodiment, when the electronic device 300 is in a folded state (e.g., the state of FIG. 3B), the first housing structure 310 and the second housing structure 320 may be disposed to face each other. The first area 331a and the second area 331b of the display unit 330 may form a narrow angle (e.g., between 0° and 10°) and face each other. At least a portion of the folding area 331c may be formed in a curved surface having a predetermined curvature.

In an embodiment, when the electronic device 300 is in an intermediate state, the first housing structure 310 and the second housing structure 320 may be disposed at a certain angle. The first area 331a and the second area 331b of the display unit 330 may form an angle larger than a folded state and smaller than a flat state. At least a portion of the folding area 331c may be formed in a curved surface having a predetermined curvature, and the curvature in this case may be smaller than that of a folded state.

Referring to FIG. 3C, in an embodiment, the electronic device 300 may include a display unit 330, a support member assembly 360, at least one printed circuit board 370, a first housing structure 310, a second housing structure 320, a first rear cover 340, a second rear cover 350, and a flexible printed circuit board (FPCB) 380. In this document, the display unit 330 (e.g., first display) may be referred to as a display module or a display assembly.

The FPCB 380 may include an antenna (e.g., the MST antenna 297-1, the NFC antenna 297-3, and/or the wireless charging antenna 297-5 of FIG. 2). The FPCB 380 may be positioned between the second surface 312 and the first printed circuit board 371 (e.g., attached to the second surface 312). Here, the antenna may be a flat type (or spiral type) coil having an axis substantially parallel to the first direction (or second direction) and having one or more patterns wound one or more times around the axis.

The FPCB 380 may include a plurality of layers, and an antenna may be partially formed in the plurality of layers. For example, the antenna may include a first pattern wound one or more times clockwise (or counterclockwise) around an axis substantially parallel to a first direction (or second direction). The first pattern may include a 1-1 pattern formed in the first layer and a 1-2 pattern formed in the second layer. The 1-1 pattern may be connected to the 1-2 pattern through vias. In order to form one current path, one end (or first electrode) and the other end (or second electrode) of the first pattern may be electrically connected to the electronic component (e.g., the wireless charging module 250, when the antenna is a wireless charging antenna 297-5) mounted in the first printed circuit board 371. Accordingly, when a current is fed to one end or the other end of the first pattern in the electronic component, a magnetic flux may be induced in the first direction or the second direction. A current may be induced in the antenna by the magnetic flux generated in an external electronic device (e.g., the electronic device 102 of FIG. 1), and the induced current may be transmitted to the electronic component.

The antenna may be partially formed at another position when facing the front surface in the first direction (or second direction). For example, the antenna may include a first pattern formed in the first layer of the FPCB 380 and wound one or more times clockwise (or counterclockwise) around a first axis substantially parallel to the first direction (or second direction) and a second pattern formed in the first layer (or a second layer) in a form wound one or more times in the same direction (or direction opposite to) as that of the first pattern about a second axis parallel to the first axis and having a position different from that of the first axis.

In the FPCB 380, an adhesive member 384 may be attached to a surface of facing the second surface 312. For example, the adhesive member 384 may include a conductive sponge or a conductive poron urethane material. In the FPCB 380, a member 385 for heat dissipation and/or shielding may be disposed at a surface facing the first printed circuit board 371. For example, the heat dissipation and/or shielding member 385 may include a protective film, a graphite sheet, and/or a shielding sheet.

The display unit 330 may include a display panel 331 (e.g., flexible display panel) and one or more plates 332 or layers on which the display panel 331 is seated. In one embodiment, the one or more plates 332 may include a conductive plate (e.g., a copper (Cu) sheet or a stainless steel (SUS) sheet) disposed between the display panel 331 and the support member assembly 360. According to one embodiment, the conductive plate may be formed to have substantially the same area as that of the display unit, and an area facing a folding area of the display unit may be formed to be bendable. The plate 332 may include at least one subsidiary material layer (e.g., a graphite member) disposed at a rear surface of the display panel 331. In one embodiment, the plate 332 may be formed in a shape corresponding to the display panel 331. For example, a partial area of the first plate 332 may be formed in a shape corresponding to the notch area 333 of the display panel 331.

The support member assembly 360 may include a first support member 361 (e.g., a first support plate), a second support member 362 (e.g., a second support plate), a hinge structure 364 disposed between the first support member 361 and the second support member 362, a hinge cover 365 for covering the hinge structure 364 when viewing from the outside, and at least one wiring member 363 (e.g., FPCB) crossing the first support member 361 and the second support member 362.

In one embodiment, the support member assembly 360 may be disposed between the plate 332 and at least one printed circuit board 370. For example, the first support member 361 may be disposed between the first area 331*a* of the display unit 330 and the first printed circuit board 371. The second support member 362 may be disposed between the second area 331*b* of the display unit 330 and a second printed circuit board 372.

In an embodiment, at least a portion of the hinge structure 364 and the wiring member 363 may be disposed inside the support member assembly 360. The wiring member 363 may be disposed in a direction (e.g., the X-axis direction) crossing the first support member 361 and the second support member 362. The wiring member 363 may be disposed in a direction (e.g., X-axis direction) perpendicular to a folding axis (e.g., the Y-axis or the folding axis A of FIG. 3A) of the folding area 331*c*.

In one embodiment, as mentioned above, at least one printed circuit board 370 may include a first printed circuit board 371 disposed at the side of the first support member 361 and a second printed circuit board 372 disposed at the side of the second support member 362. The first printed circuit board 371 and the second printed circuit board 372 may be disposed inside a space formed by the support member assembly 360, the first housing structure 310, the second housing structure 320, the first rear cover 340, and the second rear cover 350. In the first printed circuit board 371 and the second printed circuit board 372, components for implementing various functions of the electronic device 300 may be mounted. For example, the MST communication module 210, the NFC communication module 230, or the wireless charging module 250 of FIG. 2 may be disposed at the first printed circuit board 371 to be electrically connected to the antenna formed in the FPCB 380.

In one embodiment, a first space of the first housing structure 310 may include a first printed circuit board 371 disposed in a space formed through the first support member 361, a first battery 391 disposed at a position facing a first swelling hole 3611 of the first support member 361, at least one sensor module 381, or at least one camera module 382. The first housing structure 310 may include a window glass 383 disposed to protect at least one sensor module 381 and at least one camera module 382 at a position corresponding to a notch area 333 of the display unit 330. In an embodiment, a second space of the second housing structure 320 may include a second printed circuit board 372 disposed in a second space formed through the second support member 362 and a second battery 392 disposed at a position facing a second swelling hole 3621 of the second support member 362. According to one embodiment, the first housing structure 310 and the first support member 361 may be integrally formed. According to one embodiment, the second housing structure 320 and the second support member 362 may also be integrally formed. According to an embodiment, the sub display 352 may be disposed in the second space of the second housing structure 320. According to an embodiment, the sub display 352 (e.g., second display) may be disposed to be visible from the outside through at least a partial area of the second rear cover 350.

In one embodiment, the first housing structure 310 may include a first rotational support surface 314, and the second housing structure 320 may include a second rotational support surface 324 corresponding to the first rotational support surface 314. The first rotational support surface 314 and the second rotational support surface 324 may include a curved surface corresponding to a curved surface included in the hinge cover 365.

In an embodiment, when the electronic device 300 is in a flat state (e.g., the state of FIG. 3A), the first rotational support surface 314 and the second rotational support surface 324 may cover the hinge cover 365. Thus, the hinge cover 365 may not be exposed or minimally exposed to the rear surface of the electronic device 300. In an embodiment, when the electronic device 300 is in a folded state (e.g., the state of FIG. 3B), the first rotational support surface 314 and the second rotational support surface 324 may rotate along a curved surface included in the hinge cover 365 to maximally expose the hinge cover 365 to the rear side of the electronic device 300.

Figure 4:
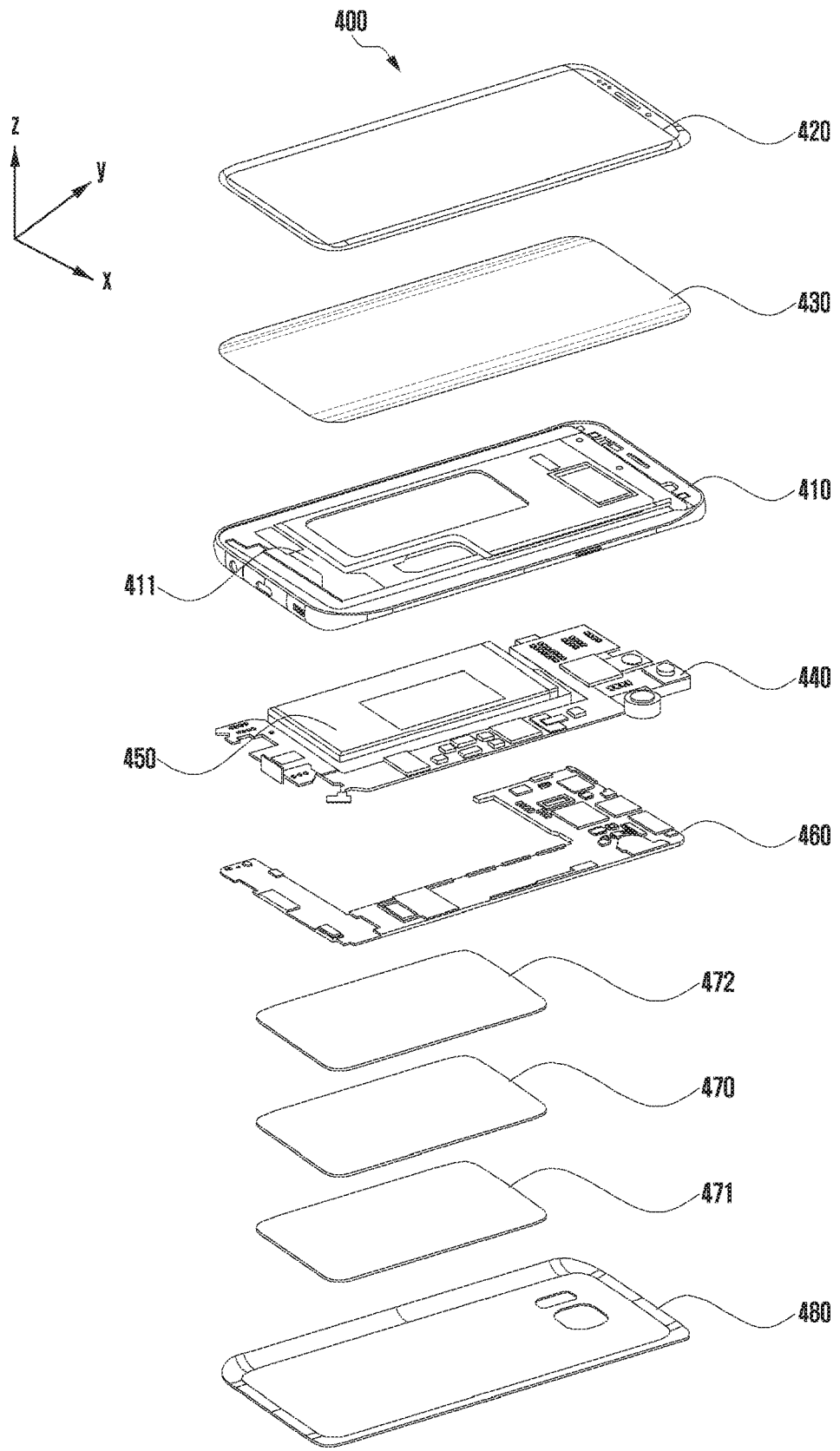
FIG. 4 is an exploded perspective view illustrating an electronic device according to an embodiment of the disclosure.

FIG. 4 is an exploded perspective view illustrating an electronic device according to an embodiment of the disclosure.

Referring to FIG. 4, an electronic device 400 (e.g., the electronic device 101 of FIG. 1) may include a side bezel structure 410, a first support member 411 (e.g., bracket), front plate (or front cover) 420, display unit 430, printed circuit board 440, battery 450, second support member 460 (e.g., rear case), FPCB 470, and rear plate (or rear cover) 480. The front plate 420 may form a first surface (or front surface) of the electronic device 400 facing in a first direction, the rear plate 480 may form a second surface (or rear surface) of the electronic device 400 facing in a second direction opposite to the first direction, and the side bezel structure 410 may form a side surface enclosing a space between the first side and the second surface. According to an embodiment, a structure including the first surface, the second surface, and the side surface may be referred to as a housing structure. In some embodiments, the electronic device 400 may omit at least one (e.g., the first support member 411 or the second support member 460) of the components or may further include other components.

The first support member 411 may be disposed inside the electronic device 400 to be connected to the side bezel structure 410 or may be integrally formed with the side bezel structure 410. The first support member 411 may be made of, for example, a metallic material and/or a non-metallic (e.g., polymer) material. The display unit 430 may be coupled to one surface of the first support member 411, and the printed circuit board 440 may be coupled to the other surface thereof. A processor, a memory, and/or an interface may be mounted to the printed circuit board 440. The processor may include, for example, one or more of a central processing unit, an application processor, a graphic processing unit, an image signal processor, a sensor hub processor, or a communication processor. The memory may include, for example, a volatile memory or a nonvolatile memory.

The interface may include, for example, a HDMI, a USB interface, an SD card interface, and/or an audio interface. The interface may, for example, electrically or physically connect the electronic device 400 to an external electronic device, and include a USB connector, an SD card/multimedia card (MMC) connector, or an audio connector.

The battery 450 supplies power to at least one component of the electronic device 400 and may include, for example, a non-rechargeable primary cell, a rechargeable secondary cell, or a fuel cell. At least a portion of the battery 450 may be disposed at, for example, substantially the same plane as that of the printed circuit board 440. The battery 450 may be integrally disposed inside the electronic device 400 or may be detachably attached to the electronic device 400.

The FPCB 470 (e.g., the FPCB 380 of FIG. 3C) may include an antenna (e.g., the MST antenna 297-1, the NFC antenna 297-3, and/or the wireless charging antenna 297-5 of FIG. 2). Here, the antenna may be a flat type (or spiral type) coil having one or more patterns wound one or more times clockwise or counterclockwise around an axis that is substantially parallel to a first direction (or second direction). The FPCB 470 may be disposed between the rear plate 480 and the printed circuit board 440. The FPCB 470 may include a plurality of layers, and an antenna may be partially formed in the plurality of layers. In the FPCB 470, an adhesive member 471 (e.g., the adhesive member 384 of FIG. 3C) may be attached to a surface of the FPCB 470 facing the rear plate 480. In the FPCB 470, the heat dissipation and/or shielding member 472 (e.g., the member 385 of FIG. 3C) may be disposed at a surface of the FPCB 470 facing the printed circuit board 440.

Figure 5:
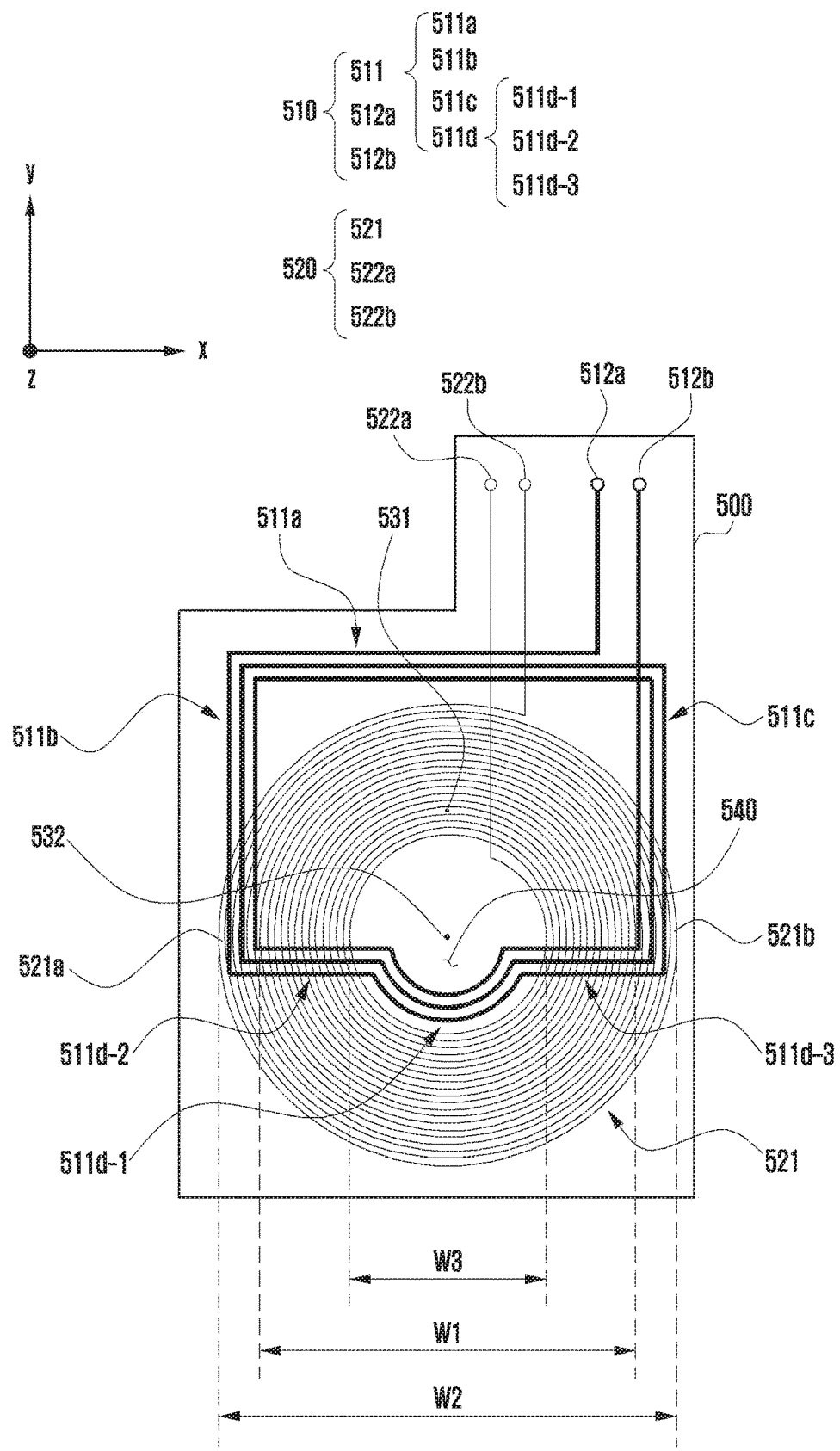
FIG. 5 is a diagram illustrating a front surface of a flexible printed circuit board (FPCB) according to an embodiment of the disclosure.

FIG. 5 is a diagram illustrating a front surface of an FPCB according to an embodiment of the disclosure.

Referring to FIG. 5, an FPCB 500 (e.g., the FPCB 380 of FIG. 3C or the FPCB 470 of FIG. 4) may include a first coil 510 and a second coil 520. In one embodiment, the first coil 510 may be a coil (e.g., the NFC antenna 297-3 of FIG. 2) that transmits and/or receives a signal of a frequency band designated for using NFC communication, and the second coil 520 may be a coil (e.g., the wireless charging antenna 297-5 of FIG. 2) that supports wireless charging.

The first coil 510 may have a first axis 531 parallel to a Z-axis direction (e.g., the Z-axis direction of FIG. 3C or FIG. 4). The first coil 510 may include a first pattern 511 one or more wound on the FPCB 500 clockwise or counterclockwise about the first axis 531, a first pad 512a connected to one end (first end) or of the first pattern 511, and a second pad 512b connected to the other end (or the second end) of the first pattern 511. The first pad 512a and the second pad 512b may be electrically connected to a wireless communication circuit (e.g., the NFC communication module 230 of FIG. 2). When a current is supplied to the first pad 512a or the second pad 512b in the wireless communication circuit, a magnetic flux may be induced in the Z-axis direction.

The second coil 520 may have a second axis 532 having a position different from that of the first axis 531, but parallel to the first axis 531. The second coil 520 may include a second pattern 521 one or more wound on the FPCB 500 clockwise or counterclockwise about the second axis 532, a third pad 522a connected to one end of the second pattern 521, and a fourth pad 522b connected to the other end of the second pattern 521. The third pad 522a and the fourth pad 522b may be electrically connected to a wireless charging circuit (e.g., the wireless charging module 250 of FIG. 2), and when a current is supplied to the third pad 522a or the fourth pad 522b in the wireless charging circuit, a magnetic flux may be induced in the Z-axis direction.

In a space formed inside the first pattern 511, a width w1 in the X-axis direction (in other words, a distance between lines formed at the innermost side in the first pattern 511 and symmetrically to the left and the right in the X-axis direction) may be smaller than a width w2 in the X-axis direction (in other words, a distance between lines formed at the outermost side in the second pattern 521 and symmetrically to the left and the right in the X-axis direction) of the second pattern 521. Accordingly, the first pattern 511 is insulated from the second pattern 521 (e.g., the first pattern 511 and the second pattern 521 are insulated by being formed in different layers), but when facing the front surface in the Z-axis direction in which a magnetic flux is induced, the first pattern 511 may overlap the second pattern 521.

According to various embodiments, a portion of the first pattern 511 may be wired to the FPCB 500 so as to be extended from the periphery of the second pattern 521 to the other periphery of the second pattern 521 across a space 540 formed inside the second pattern 521; thus, when a current is supplied to the first pattern 511, parasitic resonance that may be caused in the first pattern 511 can be minimized.

According to one embodiment, the second surface (e.g., the second surface 312 of FIGS. 3A and 3B or the rear plate 480 of FIG. 4) may have a first side extended wider than a width w2 in an X-axis direction and a second side extended in a Y-axis direction perpendicular to the first side. The second side may be extended longer than the first side. The first pattern 511 may be divided into a first portion 511a, a second portion 511b, a third portion 511c, and a fourth portion 511d when facing the front surface (e.g., second surface) in the Z-axis direction. The first portion 511a may be extended in a first direction (e.g., the X-axis direction) perpendicular to the Z-axis direction so as not to overlap the second pattern 521 and have a width smaller than that of the first side. The second portion 511b may be extended in a second direction (e.g., Y-axis direction) perpendicular to the Z-axis direction from one end (e.g., left end) of the first portion 511a to a first periphery (e.g., left periphery) 521a of the second pattern 521. The third portion 511c may be extended in a third direction (e.g., the Y-axis direction identical to the second direction) perpendicular to the Z-axis direction from the other end (e.g., right end) of the first portion 511a to a second periphery (e.g., right periphery) 521b of the second pattern 521. The fourth portion 511d may be extended from the first periphery 521a to the second periphery 521b across the space 540.

According to various embodiments, a portion of the fourth portion 511d overlapping the second pattern 521 is wired to the FPCB 500 so as to cross to be substantially a right angle to the second pattern 521; thus, parasitic resonance can be prevented or minimized.

According to an embodiment, the second pattern 521 may be wired to the FPCB 500 in a form wound one or more times clockwise or counterclockwise about the second axis 532 so as to have a specified shape (e.g., round). The fourth portion 511d may be divided into a 4-1 portion 511d-1 positioned in the space 540, a 4-2 portion 511d-2 extended from the first periphery 521a to the 4-1 portion 511d-1, and a 4-3 portion 511d-3 extended from the 4-1 portion 511d-1 to the second periphery 521b. The 4-2 portion 511d-2 may be extended straight toward the space 540 to be orthogonal to a tangent of the curved second pattern 521. The 4-3 portion 511d-3 may also be extended straight toward the space 540 to be perpendicular to a tangent of the second pattern 521.

As illustrated, the 4-1 portion 511d-1 may be disposed in the space 540 and have a round shape for data transmission and reception to and from an external electronic device having a small coil size (e.g., a coil having an outer diameter of about a width w3 (in other words, a distance between lines formed at the innermost side in the second pattern 521 and symmetrically to the left and the right in the X-axis direction of the space 540).

The FPCB 500 may include a plurality of layers. For example, a portion of the second pattern 521 may be wired to the first layer (or lower layer), and another portion of the second pattern 521 may be wired to the second layer (or upper layer). The other portion may be connected to the portion through vias. The first pattern 511 may be formed in the first layer or the second layer and may be wired so as not to overlap a portion of the second pattern 521 formed in the corresponding layer.

Figure 6A:
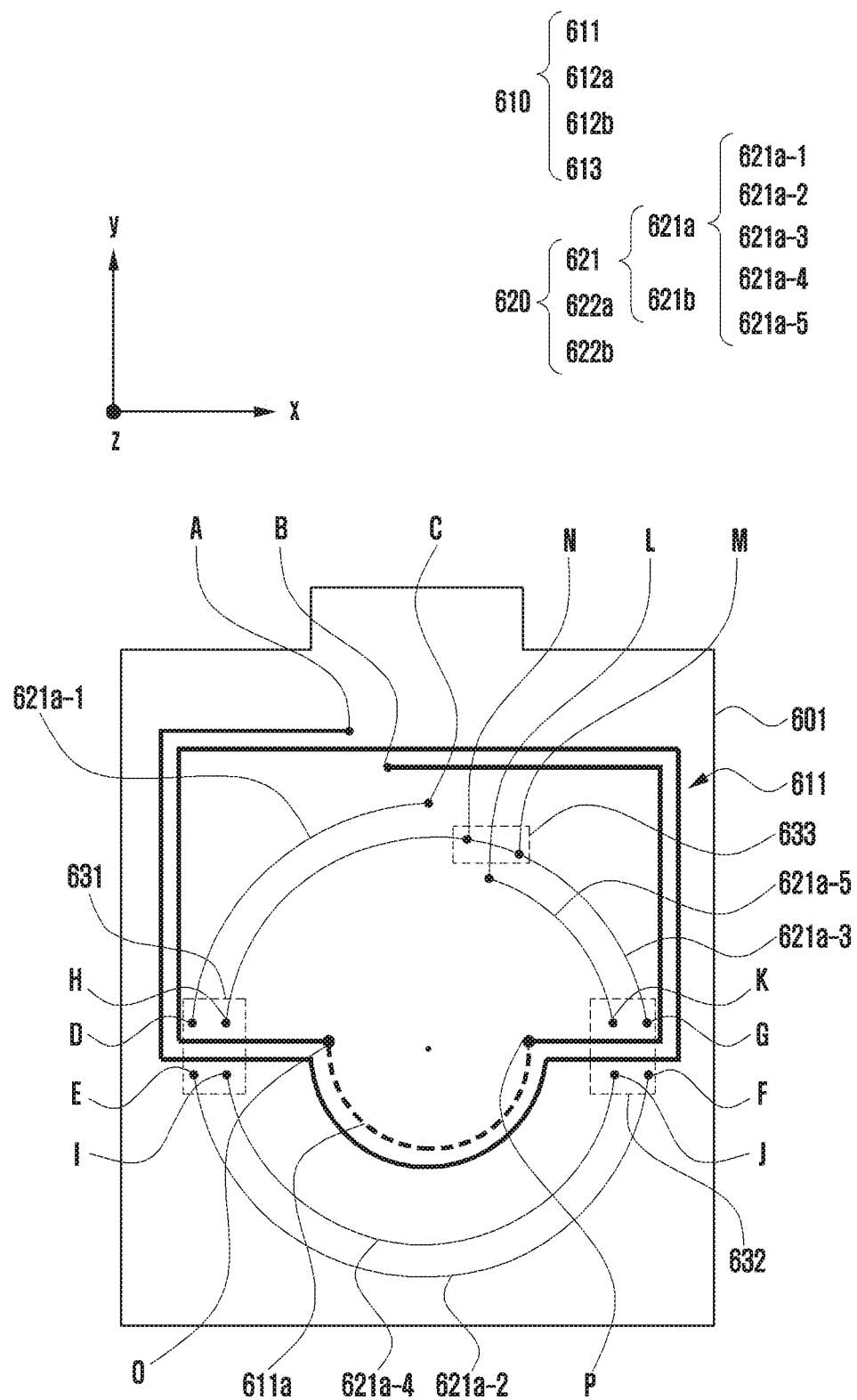
FIG. 6A is a diagram illustrating a first layer of an FPCB according to an embodiment of the disclosure.

FIG. 6A is a diagram illustrating a first layer of an FPCB according to an embodiment of the disclosure.

Figure 6B:
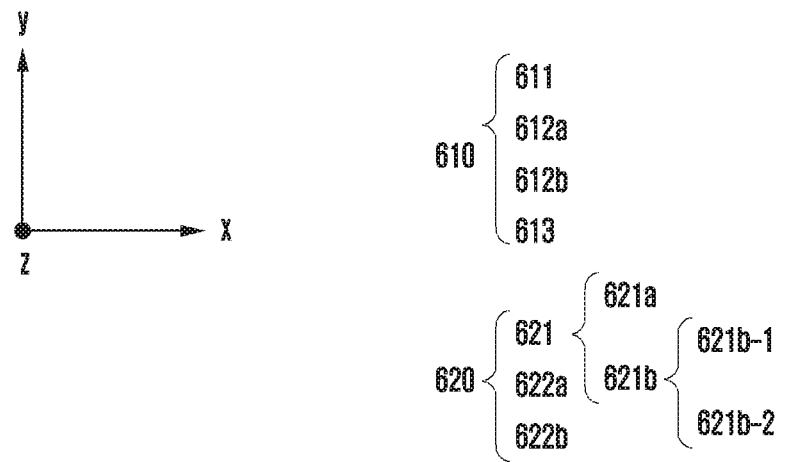
FIG. 6B is a diagram illustrating a second layer of an FPCB according to an embodiment of the disclosure.
Figure 6B:
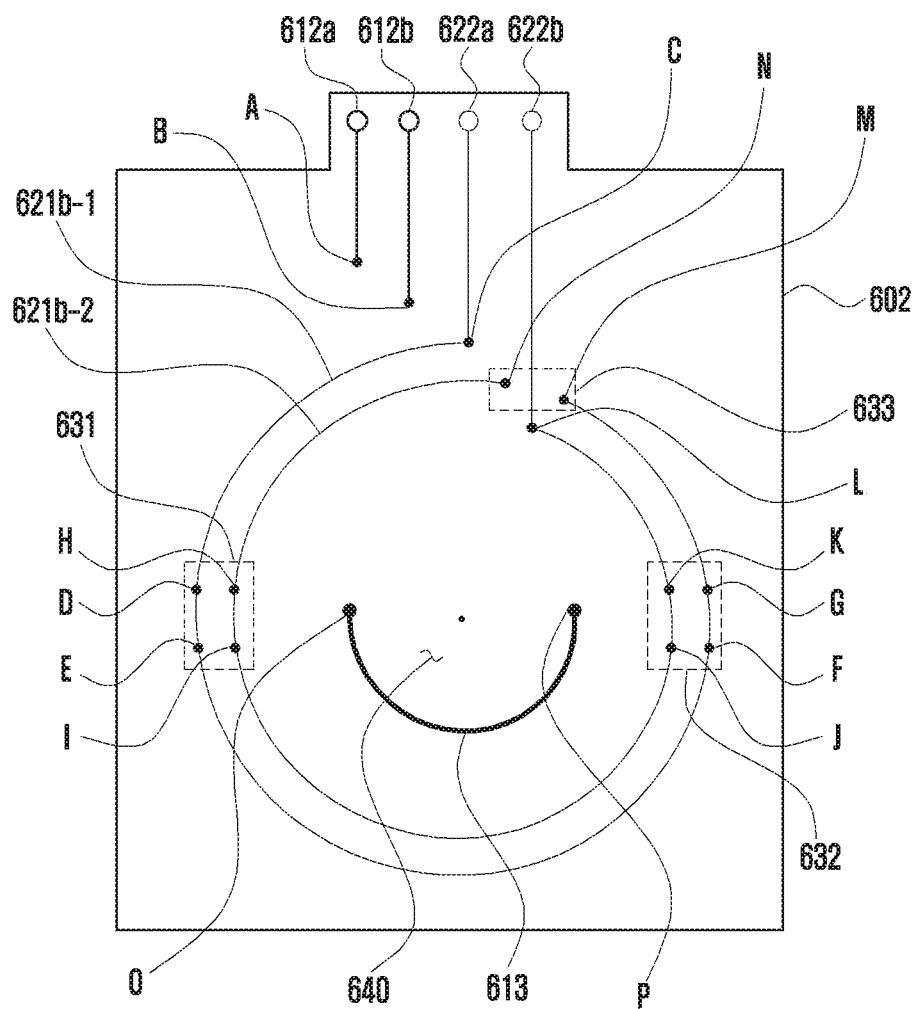

FIG. 6B is a diagram illustrating a second layer of an FPCB according to an embodiment of the disclosure. For convenience of description, components repeated with FIG. 5 are omitted or briefly described.

Referring to FIGS. 6A and 6B, a first coil 610 (e.g., the first coil 510 of FIG. 5) may include a first pattern 611, a first pad 612a, and a second pad 612b. A second coil 620 (e.g., the second coil 520 of FIG. 5) may include a second pattern 621, a third pad 622a, and a fourth pad 622b.

The first pattern 611 (e.g., the first pattern 511 of FIG. 5) may be wired to a first layer 601. The second pattern 621 (e.g., the second pattern 521 of FIG. 5) may include a 2-1 pattern 621a wired to the first layer 601 so as not to overlap the first pattern 611 and a 2-2 pattern 621b wired to a second layer 602. The pads 612a, 612b, 622a, and 622b may be formed in the second layer 602. At least some of the pads 612a, 612b, 622a, and 622b may be formed in the first layer 601.

One end of the first pattern 611 (e.g., one end of the first pattern 511 of FIG. 5) may be connected to the first pad 612a through a via A, and the other end thereof (e.g., the other end of the first pattern 511 of FIG. 5) may be connected to the second pad 612b through a via B.

The 2-1 pattern 621a may be wired to the first layer 601 so as to have a designated shape (e.g., round) about an axis parallel to the Z-axis direction (e.g., the second axis 532 of FIG. 5). The 2-1 pattern 621a may be divided into several portions, for example, five portions 621a-1, 621a-2, 621a-3, 621a-4, and 621a-5 so as not to overlap the first pattern 611 in a first area 631 and a second area 632 crossing the first pattern 611 to be wired to the first layer 601.

The 2-1 pattern 621a may be connected to the 2-2 pattern 621b through vias. For example, a first portion 621a-1 may be connected to the 2-2 pattern 621b through vias C and D. A second portion 621a-2 may be connected to the 2-2 pattern 621b through vias E and F. A third portion 621a-3 may be connected to the 2-2 pattern 621b through vias G and H. A fourth portion 621a-4 may be connected to the 2-2 pattern 621b through vias I and J. A fifth portion 621a-5 may be connected to the 2-2 pattern 621b through vias K and L.

The 2-2 pattern 621b may have the same shape as that of the 2-1 pattern 621a, but be wired to the second layer 602 in the first area 631 and the second area 632 without interruption. One end of the 2-2 pattern 621b (e.g., one end of the second pattern 521 of FIG. 5) may be connected to the third pad 622a, and the other end thereof (e.g., the other end of the second pattern 521 of FIG. 5) may be connected to the fourth pad 622b. The 2-2 pattern 621b may be divided into several portions, for example, two portions 621b-1 and 621b-2 so as not to overlap a wiring in the third area 633 crossing the wiring for connection to the fourth pad 622b to be wired to the second layer 602.

The first portion 621b-1 and the second portion 621b-2 of the 2-2 pattern 621b may be connected through the 2-1 pattern 621a. For example, the first portion 621b-1 may be connected to a third portion 621a-3 of the 2-1 pattern 621a through a via M, and the second portion 621b-2 may be connected to the third portion 621a-3 of the 2-1 pattern 621a through a via N; thus the first portion 621b-1 may be connected to the second portion 621b-2 through the 2-1 pattern 621a.

In one embodiment, the first coil 610 may further include a third pattern 613 wired to the second layer 602. For example, when the third pattern 613 faces the front surface in the Z-axis direction, the third pattern 613 may be wired to have a shape (e.g., round) similar to that of the second pattern 621 in a space 640 formed inside the second pattern 621 without overlapping the second pattern 613. Both ends of the third pattern 613 may be connected to the first pattern 611 through vias O and P. In one embodiment, a portion 611a between the vias O and P in the first pattern 611 may not be wired to the first layer 601.

Figure 7:
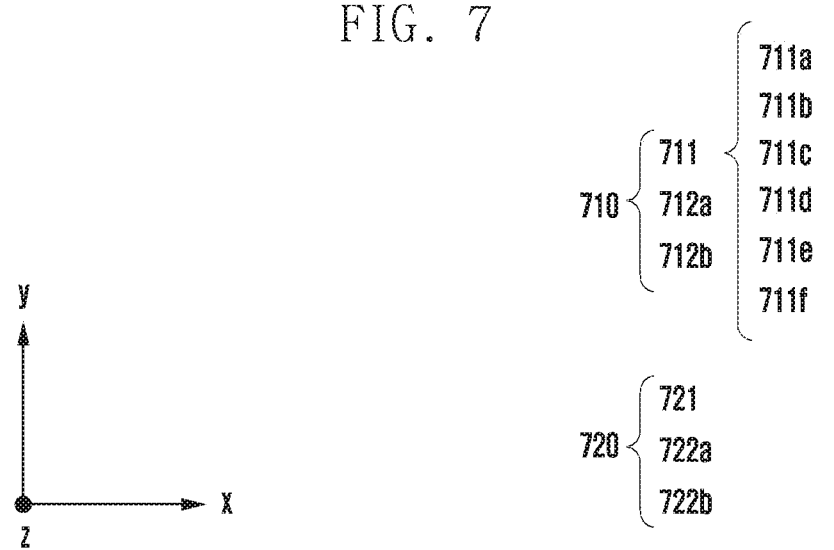
FIG. 7 is a diagram illustrating a front surface of an FPCB according to an embodiment of the disclosure.
Figure 7:
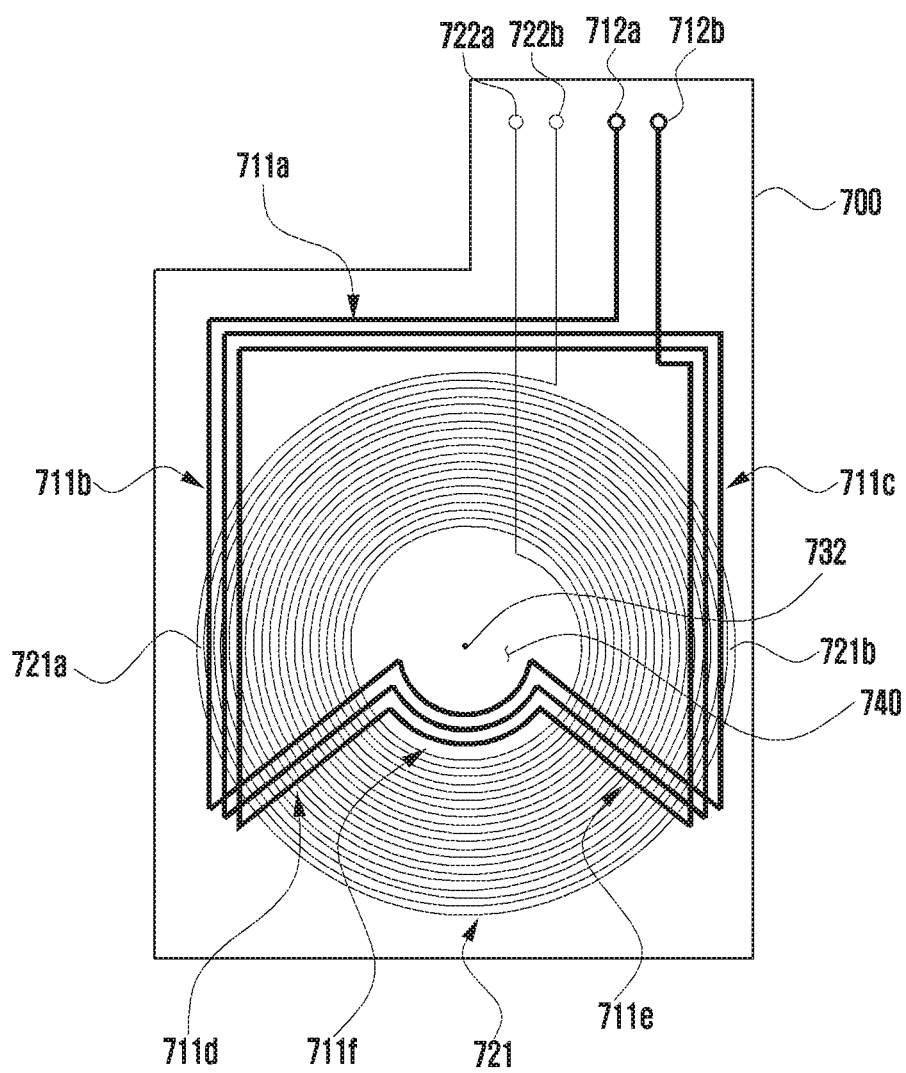

FIG. 7 is a diagram illustrating a front surface of an FPCB according to an embodiment of the disclosure. For convenience of description, components repeated with FIG. 5 are omitted or briefly described.

Referring to FIG. 7, a first coil 710 and a second coil 720 may be disposed in an FPCB 700 (e.g., the FPCB 380 of FIG. 3C or the FPCB 470 of FIG. 4). In one embodiment, the first coil 710 may be a coil (e.g., the NFC antenna 297-3 of FIG. 2) that supports NFC, and the second coil 720 may be a coil (e.g., the wireless charging antenna 297-5 of FIG. 2) that supports wireless charging.

The first coil 710 may include a first pattern 711, a first pad 712a, and a second pad 712b. The second coil 720 (e.g., the second coil 520 of FIG. 5) may include a second pattern 721, a third pad 722a, and a fourth pad 722b. In one embodiment, the first pattern 711 may be divided into a first portion 711a extended so as not to overlap the second pattern 721 when facing the front surface in the Z-axis direction, a second portion 711b extended from one end (e.g., left end) of the first portion 711a across a first periphery (e.g., left periphery) 721a of the second pattern 721, a third portion 711c extended from the other end (e.g., right end) of the first portion 711a across the second periphery 721b of the second pattern 721, a fourth portion 711d extended in a first direction (e.g., 45° direction) perpendicular to a Z-axis direction from the second portion 711b to a space 740 formed inside the second pattern 721, a fifth portion 711e extended in a second direction (e.g., 135° direction) perpendicular to a Z-axis direction from the third portion 711c to the space 740, and a sixth portion 711f positioned in the space 740.

The fourth portion 711d and the fifth portion 711e may be extended to cross at substantially right angles with a tangent of the second pattern 721. For example, the second pattern 721 may be wired to the FPCB 700 and wound one or more times clockwise or counterclockwise around an axis 732. The fourth portion 711d and the fifth portion 711e may be extended straight toward the space 740 to be orthogonal to a tangent of the curved second pattern 721.

The sixth portion 711f may be wired to the space 740 in a round shape.

The FPCB 700 may include a plurality of layers. For example, a portion of the second pattern 721 may be wired to the first layer (e.g., lower layer) and another portion of the second pattern 721 may be wired to the second layer (e.g., upper layer). The other portion may be connected to the portion through vias. The first pattern 711 may be formed at the first layer or the second layer and be wired so as not to overlap a portion of the second pattern 721 formed in the corresponding layer.

Figure 8:
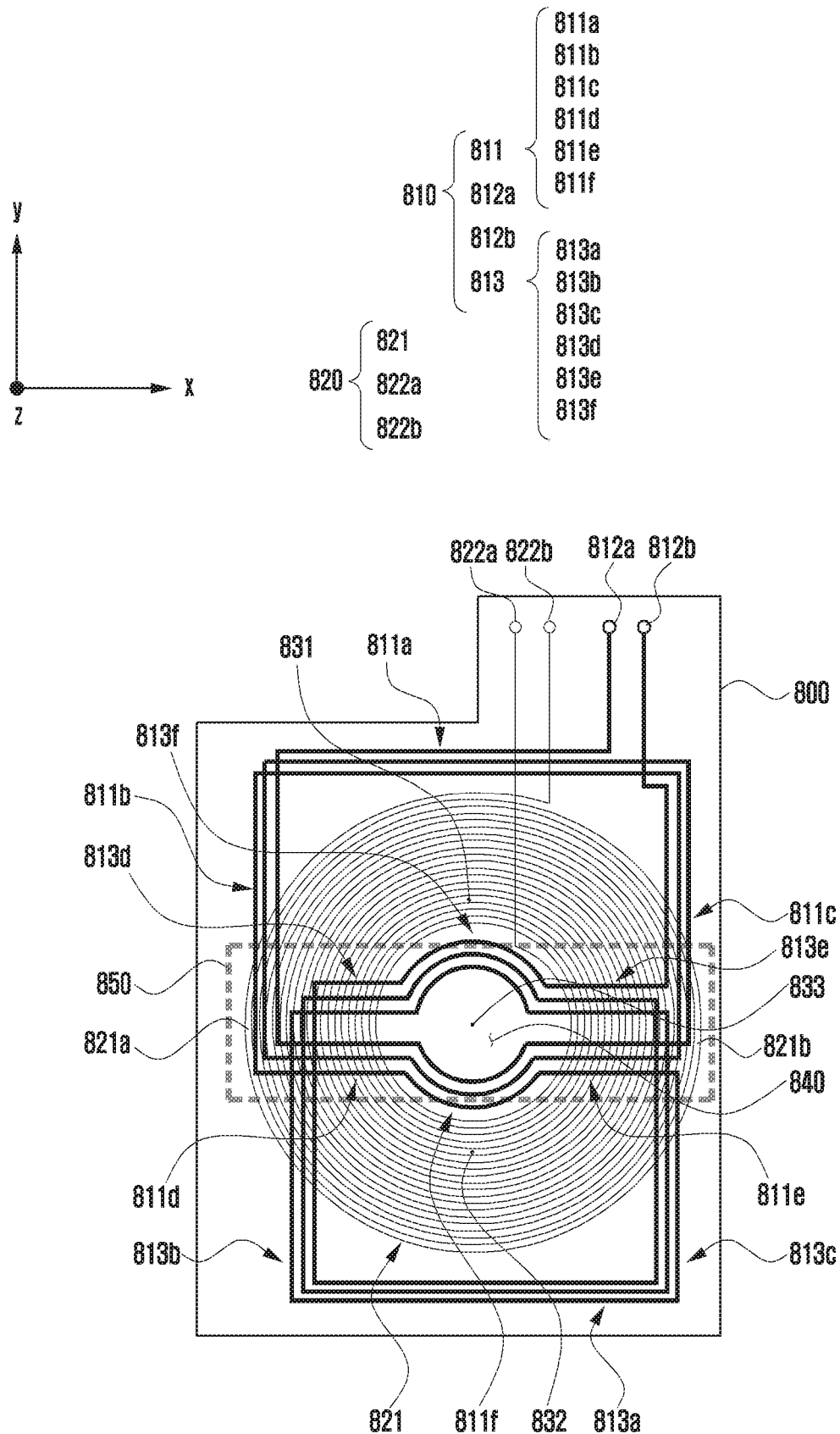
FIG. 8 is a diagram illustrating a front surface of an FPCB according to an embodiment of the disclosure.

FIG. 8 is a diagram illustrating a front surface of an FPCB according to an embodiment of the disclosure. For convenience of description, components repeated with FIG. 5 are omitted or briefly described.

Referring to FIG. 8, a first coil 810 and a second coil 820 may be disposed in an FPCB 800 (e.g., the FPCB 380 of FIG. 3C or the FPCB 470 of FIG. 4). In one embodiment, the first coil 810 may support NFC (e.g., the NFC antenna 297-3 of FIG. 2), and the second coil 820 may support wireless charging (e.g., the wireless charging antenna 297-5 of FIG. 2).

The first coil 810 may include a first pattern 811, a third pattern 813, a first pad 812a, and a second pad 812b. The second coil 820 (e.g., the second coil 520 of FIG. 5) may include a second pattern 821, a third pad 822a, and a fourth pad 822b.

The first pattern 811 may have a first axis 831 extended from the first pad 812a and parallel to a Z-axis direction (e.g., the Z-axis direction of FIG. 3C or 4). The first pattern 811 may be wired to the FPCB 800 in a form wound one or more times clockwise or counterclockwise about the first axis 831. The third pattern 813 may have a second axis 832 extended from the first pattern 811 and parallel to the first axis 831. For example, when facing the front surface in the Z-axis direction, the first axis 831 may be positioned above a space 840 formed inside the second pattern 821, and the second axis 832 may be positioned below the space 840. The third pattern 813 may be wired to the FPCB 800 and be connected to the second pad 812b in a form wound one or more times in a direction opposite to that of the first pattern 811 about the second axis 832.

When facing the front surface in the Z-axis direction, the first pattern 811 may be divided into a first portion 811a extended above the second pattern 821 so as not to overlap the second pattern 821, a second portion 811b extended from one end (e.g., left end) of the first portion 811a to a first periphery (e.g., left periphery) 821a of the second pattern 821, a third portion 811c extended from the other end (e.g., right end) of the first portion 811a to a second periphery 821b of the second pattern 821, a fourth portion 811d extended from the first periphery 821a to the space 840, a fifth portion 811e extended from the second periphery 821b to the space 840, and a sixth portion 811f positioned in the space 840.

When facing the front surface in the Z-axis direction, the third pattern 813 may be formed in the FPCB 800 vertically symmetrical with the first pattern 811. For example, the third pattern 813 may be divided into a seventh portion 813a extended under the second pattern 821 so as not to overlap the second pattern 821, an eighth portion 813b extended from one end (e.g., left end) of the seventh portion 813a to a first periphery 821a of the second pattern 821, a ninth portion 813c extended from the other end (e.g., right end) of the seventh portion 813a to the second periphery 821b of the second pattern 821, a tenth portion 813d extended from the first periphery 821a to the space 840, an eleventh portion 813e extended from the second periphery 821b to the space 840, and a twelfth portion 813f positioned in the space 840.

As the first pattern 811 is, for example, wound clockwise, and the third pattern 813 is wound counterclockwise opposite thereto, in an area 850 in which the portions 811d, 811e, and 811f of the first pattern 811 and the portions 813d, 813e, and 813f of the third pattern 813 are dense, directions of currents may be the same. Accordingly, when a current is supplied to the first coil 810, intensity of a magnetic flux may be strongest in the area 850.

The fourth portion 811d, the fifth portion 811e, the tenth portion 813d, and the eleventh portion 813e may be extended to cross at substantially right angles with a tangent of the second pattern 821. For example, the second pattern 821 may be wired to the FPCB 800 in a form round wound one or more times clockwise or counterclockwise about a third axis 833. The portions 811d, 811e, 813d, and 813e may be extended straight toward the space 840 to be orthogonal to a tangent of the curved second pattern 821.

The sixth portion 811f and the twelfth portion 813f may be wired to the space 840 in a round shape.

The FPCB 800 may include a plurality of layers. For example, a portion of the second pattern 821 may be wired to the first layer (or lower layer) and another portion of the second pattern 821 may be wired to the second layer (or upper layer). The other portion may be connected to the portion through vias. The first pattern 811 and the third pattern 813 may be formed in the first layer or the second layer and be wired so as not to overlap a portion of the second pattern 821 formed in the corresponding layer.

Figure 9:
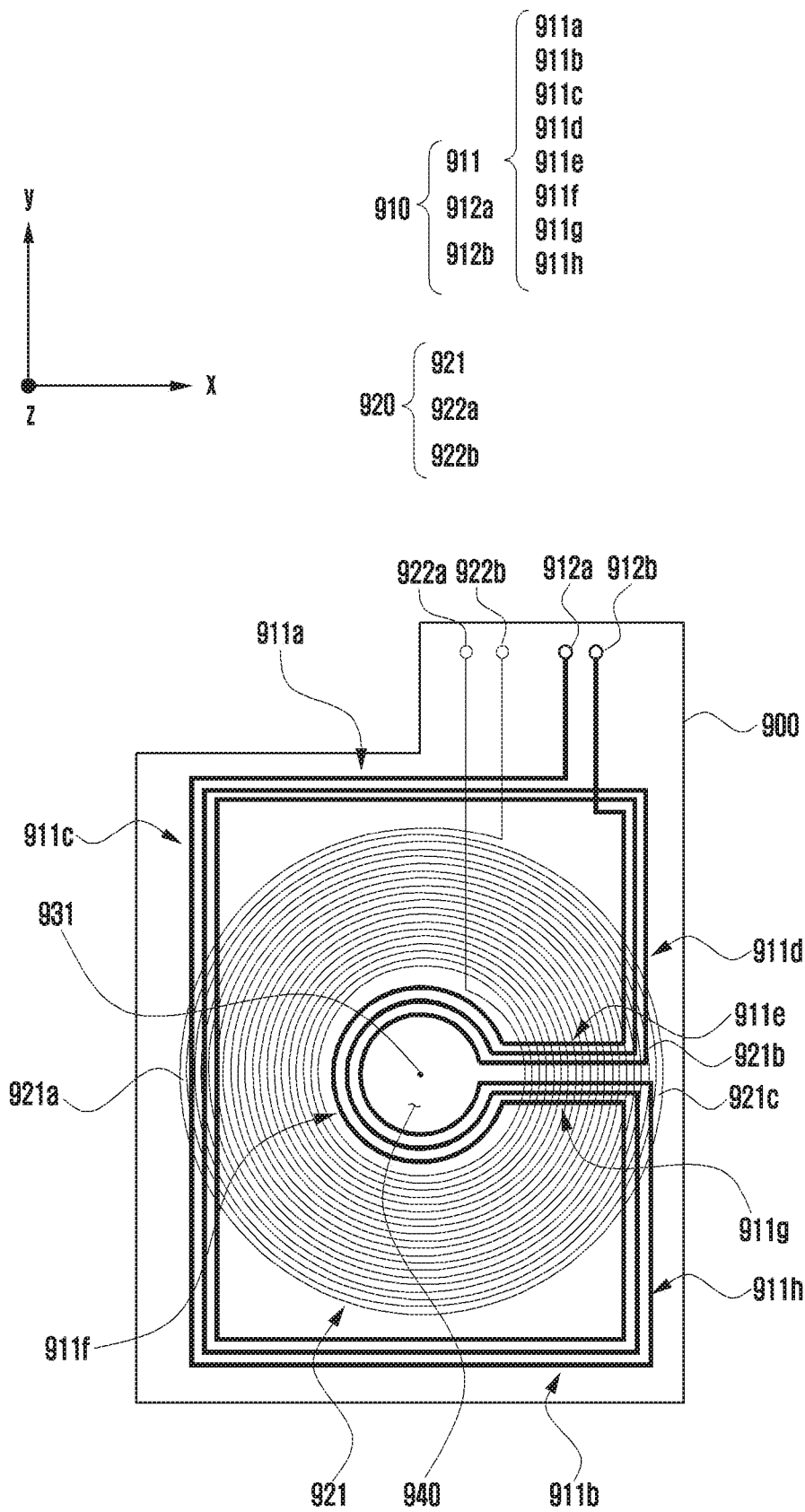
FIG. 9 is a diagram illustrating a front surface of an FPCB according to an embodiment of the disclosure.

FIG. 9 is a diagram illustrating a front surface of an FPCB according to an embodiment of the disclosure. For convenience of description, components repeated with FIG. 5 are omitted or briefly described.

Referring to FIG. 9, a first coil 910 and a second coil 920 may be disposed in an FPCB 900 (e.g., the FPCB 380 of FIG. 3C or the FPCB 470 of FIG. 4). In one embodiment, the first coil 910 may support NFC (e.g., the NFC antenna 297-3 of FIG. 2), and the second coil 920 may support wireless charging (e.g., the wireless charging antenna 297-5 of FIG. 2).

The first coil 910 may include a first pattern 911, a first pad 912a, and a second pad 912b. The second coil 920 (e.g., the second coil 520 of FIG. 5) may include a second pattern 921, a third pad 922a, and a fourth pad 922b. The first pattern 911 may have a first axis 931 parallel to the Z-axis direction (e.g., the Z-axis direction of FIG. 3C or 4). The first pattern 911 may be wired to the FPCB 900 in a form wound one or more times clockwise or counterclockwise about the first axis 931. The second pattern 921 may have a second axis (e.g., the first axis 931 identical to that of the first pattern 911) parallel to the Z-axis direction and be wired to the FPCB 900 and wound one or more times clockwise or counterclockwise around the second axis.

According to various embodiments, when facing the front surface in the Z-axis direction, a portion of the first pattern 911 may be wired to the FPCB 900 to be extended from the periphery of the second pattern 921 to a space 940 formed inside the second pattern 921. Another portion of the first pattern 911 may be wired to the FPCB 900 to be extended from the space 940 to the other periphery. Accordingly, a parasitic resonance can be prevented or minimized in the first pattern 911.

According to an embodiment, when facing the front surface in the Z-axis direction, the first pattern 911 may be divided into eight portions 911a, 911b, 911c, 911d, 911e, 911f, 911g, and 911h. A first portion 911a may be extended in a first direction (e.g., the X-axis direction) perpendicular to the Z-axis direction on the second pattern 921 so as not to overlap the second pattern 921. A second portion 911b may be extended in a second direction (e.g., a direction parallel to the first direction) perpendicular to the Z-axis direction below the second pattern 921 so as not to overlap the second pattern 921. A third portion 911c may be extended from one end (e.g., left end) of the first portion 911a to one end (e.g., left end) of the second portion 911b across a first periphery 921a of the second pattern 921. A fourth portion 911d may be extended from the other end (e.g., right end) of the first portion 911a to the second periphery 921b of the second pattern 921. A fifth portion 911e may be extended from the second periphery 921b to the space 940. A sixth portion 911f may be positioned in the space 940. A seventh portion 911g may be extended to a third periphery 921c so as not to overlap the fifth portion 911e in a direction (e.g., right direction) opposite to the third portion 911c in the space 940. An eighth portion 911h may be extended from the third periphery 921c to the other end (e.g., the right end) of the second portion 911b.

The fifth portion 911e and the seventh portion 911g may be extended to cross at substantially right angles with a tangent of the second pattern 921. For example, the fifth portion 911e and the seventh portion 911g may be extended straight toward the space 940 to be orthogonal to a tangent of the curved second pattern 921. The sixth portion 911f may be roundly wired to the space 940.

The FPCB 900 may include a plurality of layers. For example, a portion of the second pattern 921 may be wired to the first layer (or lower layer) and another portion of the second pattern 921 may be wired to the second layer (or upper layer). The other portion may be connected to the portion through vias. The first pattern 911 may be formed in the first layer or the second layer and be wired so as not to overlap a portion of the second pattern 921 formed in the corresponding layer.

Figure 10A:
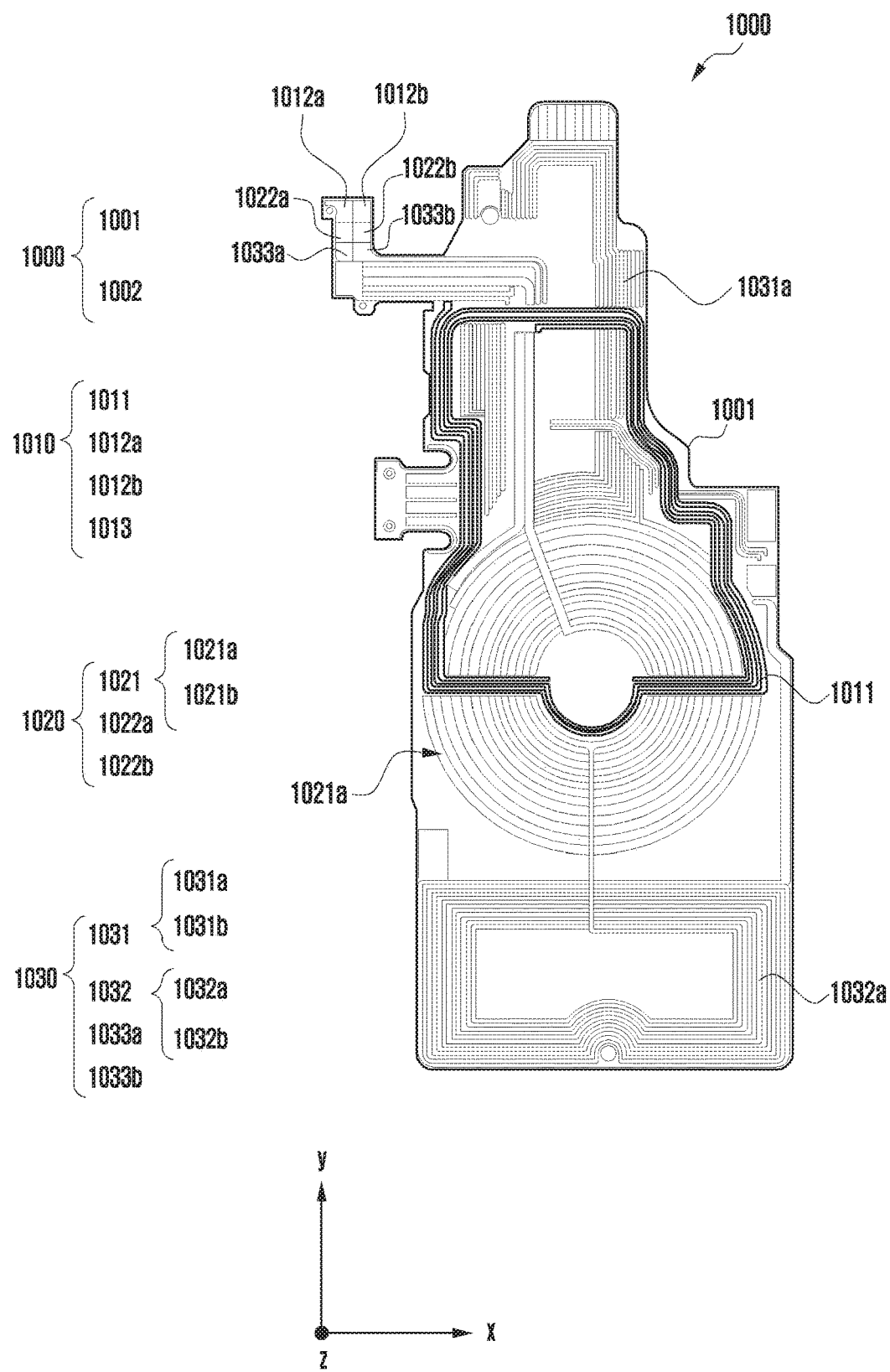
FIG. 10A is a diagram illustrating a first layer of an FPCB according to an embodiment of the disclosure.

FIG. 10A is a diagram illustrating a first layer of an FPCB according to an embodiment of the disclosure.

Figure 10B:
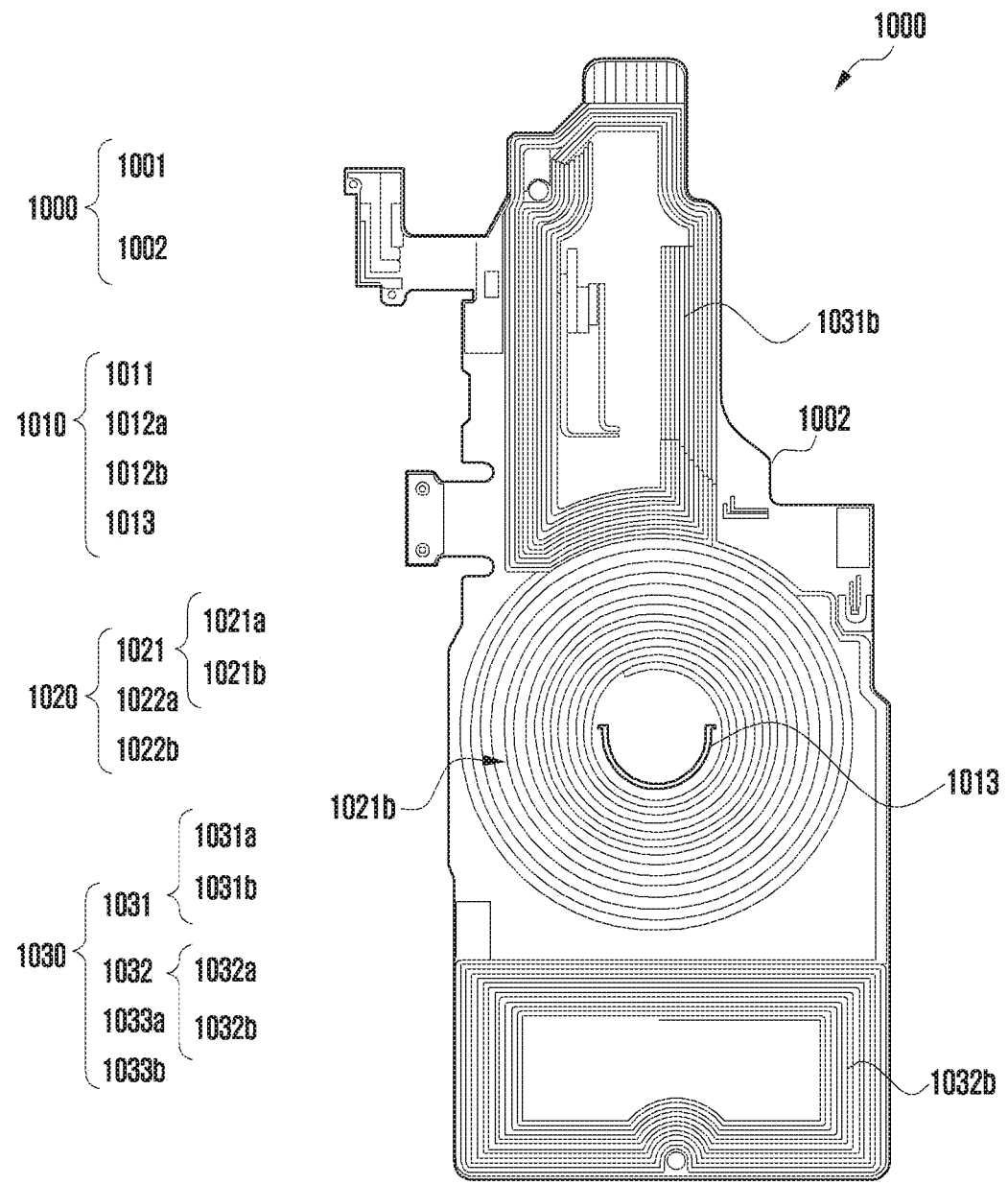
FIG. 10B is a diagram illustrating a second layer of an FPCB according to an embodiment of the disclosure.

FIG. 10B is a diagram illustrating a second layer of an FPCB according to an embodiment of the disclosure. For convenience of description, components repeated with FIGS. 6A and 6B are omitted or briefly described.

Referring to FIGS. 10A and 10B, a first coil 1010 may include a first pattern 1011, a first pad 1012a, and a second pad 1012b. A second coil 1020 may include a second pattern 1021, a third pad 1022a, and a fourth pad 1022b. A third coil 1030 may include a third pattern 1031, fourth pattern 1032, fifth pad 1033a, and sixth pad 1033b. The pads 1012a, 1012b, 1022a, 1022b, 1033a, and 1033b may be formed in a first layer 1001 of an FPCB 1000. In one embodiment, the first coil 1010 may be a coil (e.g., the NFC antenna 297-3 of FIG. 2) that supports NFC, the second coil 1020 may be a coil (e.g., the wireless charging antenna 297-5 of FIG. 2) that supports wireless charging, and the third coil 1030 may be a coil (e.g., the MST antenna 297-1 of FIG. 2) that supports MST.

Both ends of the first pattern 1011 (e.g., the first pattern 611 of FIGS. 6A and 6B) are connected to the first pad 1012a and the second pad 1012b, respectively, and the first layer 1001 may be wired to the first layer 1001 in a form wound one or more times clockwise or counterclockwise about the first layer 1001 parallel to a Z-axis direction (e.g., the Z-axis direction of FIG. 3C or FIG. 4).

Both ends of the second pattern 1021 (e.g., the second pattern 621 of FIGS. 6A and 6B) may be connected at to the third pad 1022a and the fourth pad 1022b, respectively, and be wired to the first layer 1001 and a second layer 1002 and wound one or more times clockwise or counterclockwise around a second axis having a position different from that of the first axis and parallel to the first axis. In one embodiment, the second pattern 1021 may include a 2-1 pattern 1021a wired to the first layer 1001 and a 2-2 pattern 1021b wired to the second layer 1002. The 2-1 pattern 1021a may be wired to the first layer 1001 so as not to overlap the first pattern 1011 in a form round wound one or more times clockwise or counter-clockwise about the second axis. The 2-2 pattern 1021b may be wired to the second layer 1002 in a form round wound one or more times in the same direction as that of the 2-1 pattern 1021a about the second axis. The 2-1 pattern 1021a may be connected to the 2-2 pattern 1021b through a plurality of vias (not illustrated).

When facing the front surface in the Z-axis direction, the third pattern 1031 may be formed on the second pattern 1021. The third pattern 1031 may have a third axis extended from one of the fifth pad 1033a and the sixth pad 1033b and parallel to the Z-axis direction. The third pattern 1031 may be wired to the first layer 1001 and the second layer 1002 in a form wound one or more times clockwise or counterclockwise about the third axis. The third pattern 1031 may include a 3-1 pattern 1031a wired to the first layer 1001 without overlapping the first pattern 1011 and a 3-2 pattern 1031b wired to the second layer 1002. The 3-1 pattern 1031a may be connected to the 3-2 pattern 1031b through a plurality of vias (not illustrated).

When facing the front surface in the Z-axis direction, the fourth pattern 1032 may be formed under the second pattern 1021. The fourth pattern 1032 may be extended from the third pattern 1031 and have a fourth axis having a position different from that of the third axis but parallel to the third pattern 1031. The fourth pattern 1032 may be wired to the first layer 1001 and the second layer 1002 in a form wound one or more times in a direction opposite to (or the same direction as) that of the third pattern 1031 about the fourth axis and be connected to the other one of the fifth pad 1033a and the sixth pad 1033b. The fourth pattern 1032 may include a 4-1th pattern 1032a wired to the first layer 1001 and a 4-2th pattern 1032b wired to the second layer 1002. The 4-1 pattern 1032a may be connected to the 4-2 pattern 1032b through a plurality of vias (not illustrated).

The first coil 1010 may further include a fifth pattern 1013 (e.g., the third pattern 613 of FIGS. 6A and 6B) wired to the second layer 1002. The fifth pattern 1013 may be connected to the first pattern 1011 through vias (not illustrated).

Figure 11A:
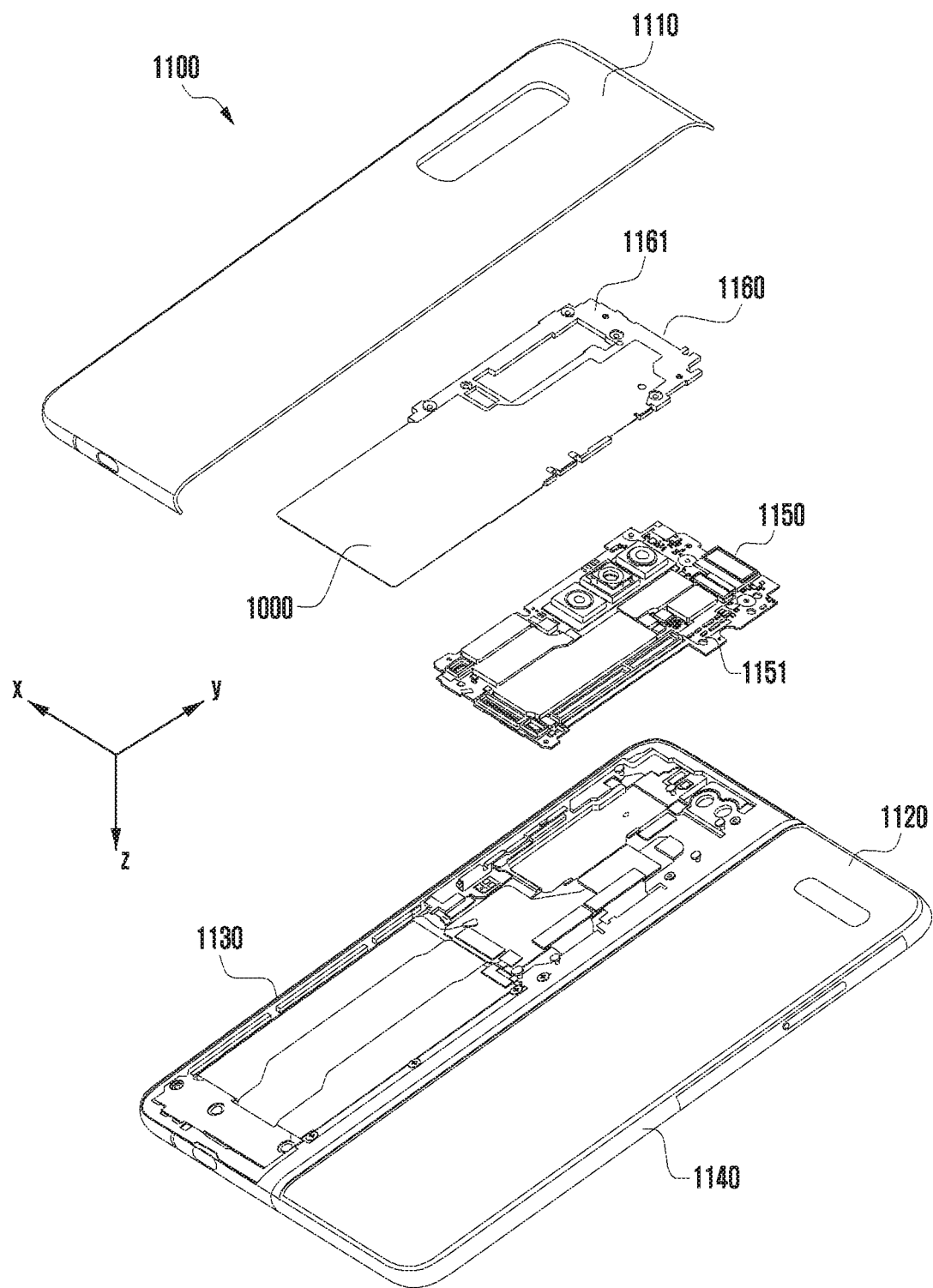
FIG. 11A is an exploded view illustrating some components of an electronic device to which the FPCBs of FIGS. 10A and 10B are applied according to an embodiment of the disclosure.

FIG. 11A is an exploded view illustrating some components of an electronic device to which the FPCBs of FIGS. 10A and 10B are applied according to an embodiment of the disclosure.

Figure 11B:
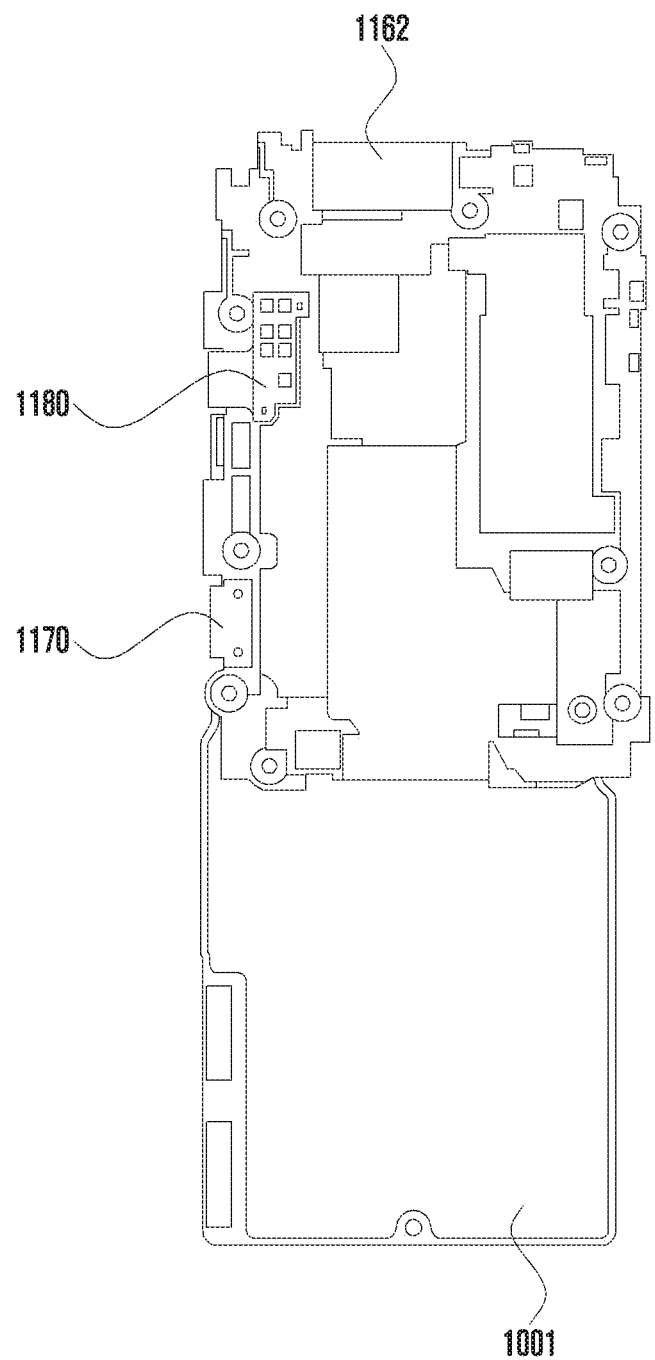
FIG. 11B is a diagram illustrating a surface facing a printed circuit board in a structure in which the FPCB is coupled to a support member according to an embodiment of the disclosure.

FIG. 11B is a diagram illustrating a surface facing a printed circuit board in a structure in which the FPCB is coupled to a support member according to an embodiment of the disclosure. For convenience of description, components repeated with the electronic device 300 illustrated through FIGS. 3A, 3B, and 3C are omitted or briefly described.

Referring to FIGS. 11A and 11B, an electronic device 1100 may include a first rear cover 1110, a second rear cover 1120, a first housing structure 1130, a second housing structure 1140 rotatably coupled to the first housing structure 1130, a printed circuit board 1150 positioned inside the first housing structure 1130, the FPCB 1000, and a support member 1160 positioned between the printed circuit board 1150 and the FPCB 1000.

The support member 1160 may include a first surface (or front surface) 1161 positioned inside the first housing structure 1130 so as to face the first rear cover 1120 and a second surface (or rear surface) 1162 positioned inside the first housing structure 1130 so as to face the printed circuit board 1150. The FPCB 1000 may be attached to the first surface 1161. For example, the first layer 1001 may be attached to the first surface 1161. In the FPCB 1000, a member 1170 for fixing the FPCB 1000 to the support member 1160 may be bent to be attached to the second surface 1162. A portion 1180 in which the pads 1012a, 1012b, 1022a, 1022b, 1033a, and 1033b are formed is bent to be attached to the second surface 1162; thus, the pads 1012a, 1012b, 1022a, 1022b, 1033a, and 1033b may be in contact with the corresponding pads 1151, respectively, formed in the printed circuit board 1150.

According to various embodiments, an electronic device may include a housing structure including a first surface facing in a first direction and a second surface facing in a second direction opposite to the first direction; a display unit disposed at the first surface; a printed circuit board disposed inside the housing structure; a first coil disposed between the printed circuit board and the second surface and electrically connected to the printed circuit board and including a first pattern wound one or more times about a first axis parallel to the second direction; and a second coil disposed between the printed circuit board and the second surface and electrically connected to the printed circuit board and including a second pattern wound one or more times about a second axis parallel to the second direction. When facing the second surface, a portion of the first pattern may be extended from a periphery of the second pattern to the other periphery of the second pattern across a space formed inside the second pattern.

When facing the second surface, the first pattern may be divided into a first portion that does not overlap the second pattern, a second portion extended from one end of the first portion to a first periphery of the second pattern, a third portion extended from the other end of the first portion to a second periphery of the second pattern, and a fourth portion extended from the first periphery to the second periphery across the space.

The second surface may have a first side extended in an X-axis direction wider than a width of the second pattern, and a second side extended in a Y-axis direction perpendicular to the first side. The first portion may have a width smaller than that of the first side. The second portion (e.g., 511b of FIG. 5) may be extended in the Y-axis direction from one end of the first portion to a first periphery of the second pattern. The third portion (e.g., 511c of FIG. 5) may be extended in the Y-axis direction from the other end of the first portion to a second periphery of the second pattern.

The first coil may further include a third pattern (e.g., 813 of FIG. 8) formed to be symmetrical up and down with the first pattern when facing the second surface.

A portion (e.g., 813d, 813e, and 813f of FIG. 8) adjacent to the fourth portion in the third pattern may be wired so that a current flows in the same direction as a direction of a current flowing in the four portion.

The second surface may have a first side extended in an X-axis direction wider than a width of the second pattern, and a second side extended in a Y-axis direction perpendicular to the first side. The first portion may be extended smaller than the first side in the X-axis direction without overlapping the second pattern. The second portion (e.g., 711b of FIG. 7) may be extended in the Y-axis direction across a first periphery of the second pattern at one end of the first portion. The third portion (e.g., 711c of FIG. 7) may be extended in the Y-axis direction across a second periphery of the second pattern at the other end of the first portion.

The second pattern may be roundly wired about the second axis, wherein the fourth portion may include a 4-1 portion positioned in the space, a 4-2 portion extended straight from the first periphery toward the space to be perpendicular to a tangent of the second pattern, and a 4-3 portion extended straight from the second periphery toward the space to be perpendicular to a tangent of the second pattern. The 4-1 portion may be roundly wired to the space.

The electronic device may further include an FPCB including a first layer (e.g., 601 of FIG. 6A) and a second layer (e.g., 602 of FIG. 6B). A portion of the second pattern may be wired to the first layer, another portion of the second pattern may be wired to the second layer and be connected to a portion of the second pattern through vias, and the first pattern may be wired to the first layer so as not to overlap a portion of the second pattern when facing the second surface.

The electronic device may further include a third coil including a third pattern electrically connected to the printed circuit board and wound one or more about a third axis parallel to the second direction and a fourth pattern wound one or more about a fourth axis parallel to the second direction; and a FPCB including the first coil, the second coil, and the third coil and disposed between the printed circuit board and the second surface.

The first coil, the second coil, and the third coil may support NFC, wireless charging, and MST, respectively.

The second surface may have a first side extended in an X-axis direction wider than a width of the second pattern, and a second side extended in a Y-axis direction perpendicular to the first side. The third pattern and the fourth pattern may be disposed on and under the second pattern in the X-axis direction.

The FPCB may include a first layer (e.g., 1001 of FIG. 10A) and a second layer (e.g., 1002 of FIG. 10B). A first portion of the second pattern may be wired to the first layer, and a second portion of the second pattern may be wired to the second layer and be connected to the first portion of the second pattern through vias. The first pattern may be wired to the first layer so as not to overlap a first portion of the second pattern when facing the second surface. A portion of the third pattern may be wired to the first layer so as not to overlap the first portion of the second pattern and the first pattern when facing the second surface, and another portion of the third pattern may be wired to the second layer. A portion of the fourth pattern may be wired to the first layer so as not to overlap the first portion of the second pattern and the first pattern when facing the second surface, and another portion of the fourth pattern may be wired to the second layer.

According to various embodiments, a foldable electronic device may include a hinge structure; a first housing structure connected to the hinge structure and including a first surface facing in a first direction and a second surface facing in a second direction opposite to the first direction; a second housing structure including a third surface connected to the hinge structure and facing in a third direction equal to the first direction in a flat state and facing the first surface in a folded state, and a fourth surface facing in a fourth direction opposite to the third direction; a first display including a first portion disposed at the first surface and a second portion extended from the first portion and disposed at the third surface; a second display disposed at the fourth surface; a printed circuit board disposed inside the first housing structure; a first coil disposed between the printed circuit board and the second surface and electrically connected to the printed circuit board and including a first pattern wound one or more times about a first axis parallel to the second direction; and a second coil disposed between the printed circuit board and the second surface and electrically connected to the printed circuit board and including a second pattern wound one or more times about a second axis parallel to the second direction. When facing the second surface, a portion of the first pattern may be extended from a periphery of the second pattern to another periphery of the second pattern across a space formed inside the second pattern.

According to various embodiments, an electronic device may include a housing structure including a first surface facing in a first direction and a second surface facing in a second direction opposite to the first direction; a display unit disposed at the first surface; a printed circuit board disposed inside the housing structure; a first coil disposed between the printed circuit board and the second surface and electrically connected to the printed circuit board, and including a first pattern wound one or more times about a first axis parallel to the second direction; and a second coil disposed between the printed circuit board and the second surface and electrically connected to the printed circuit board and including a second pattern wound one or more times about a second axis parallel to the second direction. When facing the second surface, the first pattern (e.g., 911 of FIG. 9) may be divided into a first portion extended in a third direction perpendicular to the second direction over the second pattern so as not to overlap the second pattern, a second portion extended in a fourth direction perpendicular to the second direction under the second pattern so as not to overlap the second pattern, a third portion extended from one end of the first portion to one end of the second portion across a first periphery of the second pattern, a fourth portion extended from the other end of the first portion to a second periphery of the second pattern, a fifth portion extended from the second periphery to a space formed inside the second pattern, a sixth portion positioned in the space, a seventh portion extended from the space to a third periphery in a direction opposite to that of the third portion, and an eighth portion extended from the third periphery to the other end of the second portion. The sixth portion may be roundly wired to the space.

Various embodiments can provide an electronic device having a disposition structure of coils capable of preventing or minimizing parasitic resonance even if patterns are overlapped because of a narrow width of the electronic device.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a housing structure comprising a first surface facing in a first direction and a second surface facing in a second direction opposite to the first direction;
a display disposed at the first surface;
a printed circuit board disposed inside the housing structure;
a first coil disposed between the printed circuit board and the second surface and electrically connected to the printed circuit board and comprising a first pattern wound one or more times about a first axis parallel to the second direction; and
a second coil disposed between the printed circuit board and the second surface and electrically connected to the printed circuit board and comprising a second pattern wound one or more times about a second axis parallel to the second direction,
wherein a portion of the first pattern extends from a periphery of the second pattern to another periphery of the second pattern across a space formed inside the second pattern,
wherein the first pattern is divided into:
a first portion that does not overlap the second pattern,
a second portion extending from an end of the first portion to a first periphery of the second pattern,
a third portion extending from another end of the first portion to a second periphery of the second pattern, and
a fourth portion extending from the first periphery to the second periphery across the space,
wherein the second pattern is wound around the second axis, and
wherein the fourth portion comprises:
a 4-1 portion positioned in the space,
a 4-2 portion extending straight from the first periphery toward the space to be perpendicular to a tangent of the second pattern, and
a 4-3 portion extending straight from the second periphery toward the space to be perpendicular to a tangent of the second pattern.

2. The electronic device of claim 1,
wherein the second surface has a first side extending in an X-axis direction wider than a width of the second pattern, and a second side extending in a Y-axis direction perpendicular to the first side,
wherein the first portion has a width smaller than that of the first side, wherein the second portion extends in the Y-axis direction from one end of the first portion to a first periphery of the second pattern, and wherein the third portion extends in the Y-axis direction from the other end of the first portion to a second periphery of the second pattern.

3. The electronic device of claim 2, wherein the first coil further comprises a third pattern formed to be symmetrical in a direction with the first pattern.

4. The electronic device of claim 3, wherein a portion of the third pattern is adjacent to the fourth portion and a current flows in the same direction as a current flowing in the fourth portion.

5. The electronic device of claim 1, wherein the second surface has a first side extending in an X-axis direction and having a width wider than a width of the second pattern, and a second side extends in a Y-axis direction perpendicular to the first side, wherein the first portion extends in the X-axis direction and has a width narrower than the first side without overlapping the second pattern, wherein the second portion extends in the Y-axis direction across a first periphery of the second pattern at an end of the first portion, and wherein the third portion extends in the Y-axis direction across a second periphery of the second pattern at an opposing end of the first portion.

6. The electronic device of claim 1, wherein the 4-1 portion is wound around the space.

7. The electronic device of claim 1, further comprising a flexible printed circuit board (FPCB) comprising a first layer and a second layer, wherein a portion of the second pattern is connected to the first layer, wherein another portion of the second pattern is connected to the second layer and is connected to a portion of the second pattern through vias, and wherein the first pattern is connected to the first layer and does not overlap a portion of the second pattern.

8. The electronic device of claim 1, further comprising:

a third coil comprising a third pattern and a fourth pattern, the third pattern being electrically connected to the printed circuit board and wound one or more times about a third axis parallel to the second direction, and the fourth pattern being wound one or more times about a fourth axis parallel to the second direction; and an FPCB comprising the first coil, the second coil, and the third coil and disposed between the printed circuit board and the second surface.

9. The electronic device of claim 8, wherein the first coil supports near field communication (NFC), the second coil supports wireless charging, and the third coil supports magnetic secure transmission (MST).

10. The electronic device of claim 8, wherein the second surface has a first side extending in an X-axis direction and having a width wider than a width of the second pattern, and a second side extending in a Y-axis direction perpendicular to the first side, and wherein the third pattern and the fourth pattern are disposed on or under the second pattern in the X-axis direction.

11. The electronic device of claim 10, wherein the FPCB comprises a first layer and a second layer, wherein a first portion of the second pattern is connected to the first layer, and a second portion of the second pattern is connected to the second layer and is connected to the first portion of the second pattern through vias, wherein the first pattern is connected to the first layer and does not overlap the first portion of the second pattern, wherein a portion of the third pattern is connected to the first layer and does not overlap the first portion of the second pattern and the first pattern, and another portion of the third pattern is connected to the second layer, and wherein a portion of the fourth pattern is connected to the first layer and does not overlap the first portion of the second pattern and the first pattern, and another portion of the fourth pattern is connected to the second layer.

12. An electronic device, comprising:

a hinge structure;

a first housing structure connected to the hinge structure and comprising a first surface facing a first direction and a second surface facing a second direction opposite to the first direction;

a second housing structure comprising a third surface connected to the hinge structure and facing the first direction in a flat state and facing the first surface in a folded state, and a fourth surface facing in a fourth direction opposite to the first direction;

a first display comprising a first portion disposed at the first surface and a second portion extending from the first portion to be disposed at the third surface;

a second display disposed at the fourth surface;

a printed circuit board disposed inside the first housing structure;

a first coil disposed between the printed circuit board and the second surface and electrically connected to the printed circuit board and comprising a first pattern wound one or more times about a first axis parallel to the second direction; and a second coil disposed between the printed circuit board and the second surface and electrically connected to the printed circuit board and comprising a second pattern wound one or more times about a second axis parallel to the second direction, wherein, when facing the second surface, a portion of the first pattern extends from a periphery of the second pattern to another periphery of the second pattern across a space formed inside the second pattern, wherein the first pattern is divided into:

a first portion that does not overlap the second pattern, a second portion extending from an end of the first portion to a first periphery of the second pattern, a third portion extending from another end of the first portion to a second periphery of the second pattern, and a fourth portion extending from the first periphery to the second periphery across the space, wherein the second pattern is wound around the second axis, and wherein the fourth portion comprises:

a 4-1 portion positioned in the space, a 4-2 portion extending straight from the first periphery toward the space to be perpendicular to a tangent of the second pattern, and a 4-3 portion extending straight from the second periphery toward the space to be perpendicular to a tangent of the second pattern.

13. The electronic device of claim 12, further comprising:

a third coil comprising a third pattern electrically connected to the printed circuit board and wound one or more times about a third axis parallel to the second direction and a fourth pattern wound one or more times about a fourth axis parallel to the second direction; and an FPCB comprising the first coil, the second coil, and the third coil and disposed between the printed circuit board and the second surface.

14. The electronic device of claim 13, wherein the first coil supports NFC, the second coil supports wireless charging, and the third coil supports MST.

15. The electronic device of claim 13,
wherein the second surface comprises a first side extending in an X-axis direction and having a width wider than a width of the second pattern, and a second side extending in a Y-axis direction perpendicular to the first side, and
wherein the third pattern and the fourth pattern are disposed on or under the second pattern in the X-axis direction.

16. The electronic device of claim 15,
wherein the FPCB comprises a first layer and a second layer,
wherein a first portion of the second pattern is connected to the first layer, and a second portion of the second pattern is connected to the second layer and is connected to the first portion of the second pattern through vias,
wherein the first pattern is connected to the first layer and does not overlap the first portion of the second pattern,
wherein a portion of the third pattern is connected to the first layer and does not overlap the first portion of the second pattern and the first pattern, and another portion of the third pattern is connected to the second layer, and
wherein a portion of the fourth pattern is connected to the first layer and does not overlap the first portion of the second pattern and the first pattern, and another portion of the fourth pattern is connected to the second layer.

17. An electronic device, comprising:
a housing structure comprising a first surface facing in a first direction and a second surface facing in a second direction opposite to the first direction;
a display unit disposed at the first surface;
a printed circuit board disposed inside the housing structure;
a first coil disposed between the printed circuit board and the second surface and electrically connected to the printed circuit board and comprising a first pattern wound one or more times about a first axis parallel to the second direction; and
a second coil disposed between the printed circuit board and the second surface and electrically connected to the printed circuit board and comprising a second pattern wound one or more times about a second axis parallel to the second direction,
wherein the first pattern comprises:
a first portion extending in a third direction perpendicular to the second direction over the second pattern and that does not overlap the second pattern,
a second portion under the second pattern and extending in a fourth direction perpendicular to the second direction and that does not overlap the second pattern,
a third portion extending from an end of the first portion to an end of the second portion across a first periphery of the second pattern,
a fourth portion extending from the other end of the first portion to a second periphery of the second pattern,
a fifth portion extending from the second periphery to a space formed inside the second pattern,
a sixth portion positioned in the space,
a seventh portion extending from the space to a third periphery in a direction opposite to the third portion, and
an eighth portion extending from the third periphery to another end of the second portion.

18. The electronic device of claim 17, wherein the sixth portion is wound around the space.

* * * * *